US011414290B2

(12) United States Patent
Krapf et al.

(10) Patent No.: US 11,414,290 B2
(45) Date of Patent: Aug. 16, 2022

(54) APPARATUS AND METHOD FOR STACKING CARD-LIKE DATA CARRIERS

(71) Applicant: Mühlbauer GmbH & Co, Roding (DE)

(72) Inventors: Benjamin Krapf, Freihung (DE); Markus Strehle, Roding (DE)

(73) Assignee: Mühlbauer GmbH & Co. KG, Roding (DE)

( * ) Notice: Subject to any disclaimer, the term of this patent is extended or adjusted under 35 U.S.C. 154(b) by 308 days.

(21) Appl. No.: 16/617,166

(22) PCT Filed: May 28, 2018

(86) PCT No.: PCT/EP2018/063903

§ 371 (c)(1),
(2) Date: Nov. 26, 2019

(87) PCT Pub. No.: WO2018/219852

PCT Pub. Date: Dec. 6, 2018

(65) Prior Publication Data

US 2021/0163249 A1 Jun. 3, 2021

(30) Foreign Application Priority Data

May 31, 2017 (DE) ........................ 102017111909.4

(51) Int. Cl.

*B65H 31/10* (2006.01)
*B65H 29/32* (2006.01)
(Continued)

(52) U.S. Cl.

CPC ........... *B65H 29/32* (2013.01); *B65H 29/242* (2013.01); *B65H 29/245* (2013.01); *B65H 31/10* (2013.01);
(Continued)

(58) Field of Classification Search

CPC ...... B65H 2701/1914; B65H 2406/323; B65H 2301/44735; B65H 43/06; B65H 31/10; B65H 29/32; B65H 29/241; B65H 29/245
See application file for complete search history.

(56) References Cited

U.S. PATENT DOCUMENTS

| | | | | |
|---|---|---|---|---|
| 4,236,639 A * | 12/1980 | Boettge | ............... | B65B 69/0025 209/534 |
| 4,905,843 A | 3/1990 | Holbert | | |
| 2013/0062263 A1 | 3/2013 | Nakano | | |

FOREIGN PATENT DOCUMENTS

| | | |
|---|---|---|
| DE | 1923441 A1 | 1/1971 |
| DE | 10202641 A1 | 7/2003 |

(Continued)

OTHER PUBLICATIONS

Chinese Patent Office, Office Action issued in CN Application No. 201880036682.8, dated Sep. 24, 2020, 12 page (art citations provided English-readable on p. 1).

(Continued)

*Primary Examiner* — Howard J Sanders

(74) *Attorney, Agent, or Firm* — Wood Herron & Evans LLP

(57) ABSTRACT

According to several embodiments, the invention relates to a device and a method for stacking card-like data carriers. The device includes a conveying device for transporting individual card-like data carriers downstream along a conveying path and a stacking unit for selectively transferring and stacking card-like data carriers conveyed along the conveying path. The conveying device is arranged to convey the card-like data carriers in such a way that they are fixed to it in a hanging mode of transport. The stacking unit is arranged to selectively release certain ones of the card-like
(Continued)

data carriers conveyed along the conveying device from the latter in order to transfer them directly into a card magazine and to stack them therein.

23 Claims, 9 Drawing Sheets

(51) Int. Cl.
*B65H 29/24* (2006.01)
*B65H 31/34* (2006.01)
*B65H 43/06* (2006.01)

(52) U.S. Cl.
CPC ............ *B65H 31/34* (2013.01); *B65H 43/06* (2013.01); *B65H 2301/44734* (2013.01); *B65H 2301/44735* (2013.01); *B65H 2406/323* (2013.01); *B65H 2701/1914* (2013.01)

(56) References Cited

FOREIGN PATENT DOCUMENTS

| | | | | |
|---|---|---|---|---|
| DE | 10202646 | A1 * | 7/2003 | ............ B65H 29/32 |
| EA | 0095576 | A2 | 12/1983 | |
| GB | 2183222 | A | 6/1987 | |
| JP | S4943971 | U | 4/1974 | |
| JP | 59-124650 | A | 7/1984 | |

OTHER PUBLICATIONS

German Patent Office, Office Action issued in 10 2017 111 909.4 dated Apr. 14, 2018 (10 pages).
Hesse, Stefan, “Grundlagen der Handhabungstechnik” Carl Hanser Verlag GmbH Co KG, 2016, Seiten 142-145, 252-255, 370-376 (17 pages).
International Searching Authority, Search Report and Written Opinion issued in PCT/EP2018/063903 dated Sep. 3, 2018 (14 pages).
Chinese Patent Office, 2nd Office Action issued in CN Application No. 201880036682.8, dated May 18, 2021, 12 pages (no English translation available).

* cited by examiner

APPARATUS AND METHOD FOR STACKING CARD-LIKE DATA CARRIERS

CROSS-REFERENCE TO RELATED APPLICATION

This application is a national phase entry of, and claims priority to, International Application No. PCT/EP2018/063903, filed May 28, 2018, which claims priority to DE 10 2017 111 909.4, filed May 31, 2017. The above-mentioned patent applications are incorporated herein by reference in their entireties.

TECHNICAL FIELD

The present invention relates to a device and a method for stacking card-like data carriers, in particular chip cards or smart cards, in a card magazine.

BACKGROUND

In the manufacture of card-like data carriers, in particular chip cards or smartcards, as they are referred to, it is often necessary to personalize the individual data carriers. This can be done, for example, by individual printing or other processing or by providing the data carrier with particular features (for example by applying embossing or holograms). In addition, within the framework of the personalization, in particular personal data can also be stored in semiconductor chips which are embedded in the data carriers. This generates a need for individual processing and, if necessary, a subsequent inspection or testing of the data carriers so that these must be present individually and not, for example, stacked.

On the other hand, it is common, during the course of the personalization process, to combine a defined number of several of the data carriers, neatly arranged, for final packaging for transport or, as an interim step, for forwarding to a subsequent processing station. In particular, card magazines, as they are referred to, are often used for combining data carriers of similar shape or size, which card magazines are receptacles in which a defined number of the data carriers can be stacked on top of each other and can then be handled together, in particular transported, by the card magazine.

In the case of personalization devices already known, the data carriers are always transported individually through the device and must then be removed, counted and packaged manually. If the packaging or the onward transport of the data carriers is to take place by a card magazine, a manual stacking of the data carriers in the card magazine is also necessary.

Thus, it would be desirable to provide an improved device for stacking card-like data carriers. More particularly, it would be desirable to improve such devices in such a way that a stacking of data carriers in a card magazine can take place at an increased processing speed.

SUMMARY

To achieve these and other objectives, one embodiment of this invention includes a device or a method for stacking card-like data carriers as described herein, in particular also by using the device to carry out the method. Various embodiments and further developments of the invention are also described herein.

A first embodiment of the invention relates to a device for stacking card-like data carriers. The device comprises (i) a conveying device for transporting individual card-like data carriers downstream along a conveying path and (ii) a stacking unit for selectively transferring and stacking card-like data carriers conveyed along the conveying path. The conveying device is arranged to convey the card-like data carriers in such a way that they are fixed to it in a hanging mode of transport. The stacking unit is arranged to selectively release certain ones of the card-like data carriers conveyed along the conveying device from the latter in order to transfer them directly—i. e. in particular without intermediate processing, intermediate transport or intermediate storage—into a card magazine and to stack them therein when the card magazine is arranged in a stacking area at a stacking position which, in relation to the direction of gravity, is situated below the conveying path.

In the sense of the invention, a "card-like data carrier" is intended to be understood to refer to an object which is configured to carry data or information and which comprises a card-like substrate, i. e. a substantially flat substrate, on or in which data or information is applied or incorporated. In this way, such card-like data carriers can, for example, be in the form of ID documents, debit or credit cards, driver's licenses and the like. In particular, chip cards or smartcards are card-like data carriers. A chip card, often also referred to as a smartcard or integrated circuit card (ICC), is a particular plastic card with a built-in integrated circuit (chip) which contains hardware logic, a memory or a microprocessor. The ISO/IEC 7810 standard is an international standard that specifies several different formats for identity documents, to which belongs, inter alia, the "ID 1" format, which is used, for example, for bank cards, credit cards, debit cards, driver's licenses and, in particular, the electronic identity card which was introduced in Germany on 1 Nov. 2010, implemented as a chip card.

The terms "downstream" and "upstream" are intended to be understood, in the sense of the invention, in such a way that they refer to the transit path of the data carriers through the device in accordance with the invention. Accordingly, a data carrier reaches a point situated upstream in relation to a specific location along the transit path through the device before it reaches a point situated downstream of the same location. In this context, absolute directions (in relation to the earth's surface) in space are not relevant. In particular, it is easily possible that different sections of the transit path run in different absolute directions and even that in one section the transit path runs in an absolute direction which is opposite to that of other sections. In addition, in the following, the terms "downstream" and "upstream" are also used in the same way to describe the movement of card magazines through the device in accordance with the invention.

A "hanging mode of transport" of a data carrier is intended to be understood, in the sense of the invention, to refer in particular to a mode of transport for the data carriers in which the respective data carrier is fixed at its—in relation to the direction of gravity—upper end (as is typically also the case with a pendulum, for example), and/or in which the fixation or attachment of the data carrier takes place above its center of gravity. A free movement of the data carrier while at the same time being fixed (e. g. like a pendulum, which can swing about its fixed point) is however not necessary. In particular, a card-like data carrier finds itself in a suspended mode of transport if it is fixed by a first one of its two main faces, for example by suction applied to a surface, so that the other, opposite main face comes to rest—in the direction of gravity—below the first main face.

An orientation which is perpendicular with respect to the direction of gravity, i. e. a "horizontal" orientation of the data carrier, is possible and preferred, but not absolutely necessary.

In a corresponding manner, a "lying mode of transport" of a data carrier is intended to be understood, in the sense of the invention, in particular as a mode of transport for the data carriers, in which the respective data carrier is supported at its—in relation to the direction of gravity—lower end in a manner acting against the same, optionally also fixed (as is typically also the case with an object supported on a table, for example). In particular, a card-like data carrier finds itself in a lying mode of transport if it is supported on a second one of its two main faces, for example by flat or partial contact on another object, so that the opposite, first main face comes to rest—in the direction of gravity—above the second main face. An orientation which is perpendicular with respect to the direction of gravity, i. e. a horizontal orientation of the data carrier, is possible and preferred, but not absolutely necessary.

The term "selective release and transfer" of a particular one of the card-like data carriers conveyed by the conveying device, is intended to be understood, in the sense of the invention, in such a way that the stacking unit is—at least also—set up, or the stacking takes place in such a way that a decision is taken individually for the data carrier whether or where it is to be released from the conveying device and, in a corresponding manner, where it is to be transferred to after release. For example, in this way, certain data carriers can be released from the conveying device in a targeted manner in order to transfer them to the stacking area, or instead to an elimination area, instead of doing this for all of the data carriers in an indiscriminate manner, independently of a particular data carrier. However, this does not exclude the possibility that, in individual cases, all of the data carriers which are conveyed by the conveying device may be selected for release and transfer to the same card magazine or to the same elimination area during a stacking process, e. g. if they have the same or similar characteristics.

In the sense of the invention, a "stacking area" is intended to be understood to refer to a defined limited spatial area which may be part of the device in accordance with the invention or which may be located in its vicinity and which has one or more stacking positions each of which is arranged to receive a card magazine in such a way that certain data carriers which have selectively been released from the conveying device by the stacking unit can be transferred to this card magazine. To this end, the stacking area may in particular have suitable physical features, such as holders or positioning means for the card magazines.

With the aid of the aforementioned device for stacking card-like data carriers, it is possible to selectively transfer individual data carriers transported by the conveying device and without further intermediate steps into a card magazine and to stack them therein. This can significantly shorten the process chain. In particular, the data carriers to be stacked can be collected in any number within the capacity of the card magazine and can, if necessary, immediately be fed to a further process step. A manual removal of the individual data carriers from the device and a subsequent counting can thus completely be dispensed with, which in particular also leads to an increase in process speed. Thus, very high throughput rates, for example in the range of 36,000 data carriers per hour or even higher, can be achieved in principle, which can enable corresponding productivity gains to be achieved.

In the following, embodiments of the device in accordance with the invention and their further developments are described, each of which, as far as this is not expressly excluded, can be combined with each other, as well as with the other embodiments of the invention described in the following.

In accordance with an embodiment, the stacking area comprises a first stacking position and at least one further stacking position, each of which is located—in relation to the direction of gravity—below the conveying path, wherein each stacking position is configured to receive a respective card magazine. The stacking unit is arranged to selectively release certain card-like data carriers conveyed along the conveying device from the latter in order to transfer them directly to, and stack them in, a card magazine located at the first or at one of the other stacking positions. In this way it is possible, within the framework of the same processing of the data carriers, not only to fill a single card magazine but a plurality of card magazines, in particular in a sequential or in a parallel manner, wherein the allocation of the data carriers to the individual card magazines can be based on the same or, conversely, on different selection criteria for selectively releasing and transferring the data carriers. Here, the term "parallel" can be understood in particular also to mean that two data carriers are not simultaneously transferred to different card magazines, but that it is not necessary first for one of the card magazines to be completely filled before subsequent data carriers can be transferred to a different card magazine located at a different stacking position.

In particular, in accordance with a further embodiment which is based thereon, it is envisaged that the stacking unit is arranged to selectively release certain ones of the card-like data carriers conveyed along the conveying device from the latter in order to transfer them in an alternating manner, in accordance with a predetermined distribution scheme, either into a card magazine arranged at the first stacking position or into at least one further card magazine respectively arranged at one of the further stacking positions and to stack them therein. The term "in an alternating manner" may be understood in particular in the sense of "alternating", in particular also in such a way that, in accordance with the distribution scheme, a predetermined first number of data carriers is thus first transferred into a first one of the card magazines before a second, in particular identical, predetermined number of data carriers is transferred into a further one of the card magazines.

Instead, in accordance with a further embodiment, the distribution scheme may provide—at least in sections—that initially a first one of the card magazines located at the various stacking positions is filled to a defined filling level, in particular completely up to its capacity, before a further one of the card magazines is alternately filled at a different one of the stacking positions. In this way, in particular an uninterrupted operation of the device can advantageously be implemented, since, when one of the card magazines is completely filled, it can seamlessly switch to the filling of a further card magazine which still has spare capacity. While this further card magazine is being filled, the card magazine which has previously been filled can be removed from the device and can be replaced at the same stacking position by a new empty card magazine or a card magazine which still has spare capacity, in order to be subsequently used again as a stacking destination if the further card magazine currently being used for stacking is also completely filled, and so on. In this way, an uninterrupted operation can be made possible.

In accordance with a further embodiment, the device for stacking card-like data carriers further comprises a feeding device for feeding the data carriers to the conveying device, as well as a transfer section. The transfer section is arranged to remove the data carriers transported by the feeding device from the latter and to transfer them to the conveying device in such a way that the data carriers are transferred from the feeding device to the hanging mode of transport on the conveying device in an area of the conveying path which is located upstream of the stacking unit. The feeding device is arranged to transport the data carriers to the conveying device in such a way that the data carriers, at least in the transfer section, are moved in the lying mode of transport. In this way, it also becomes possible to feed the data carriers to the device for stacking in the lying mode of transport, which is predominantly used in transport devices, since this device is now itself capable of transferring the data carriers in the transfer section to the hanging mode of transport used for stacking. A standing or vertical mode of transport is also conceivable. In this way, there is an increase in flexibility as regards the integration of the device for stacking in production lines or personalization lines.

In accordance with a further embodiment, the conveying device is arranged to convey the data carriers in such a way that they are fixed to the conveying device in the hanging mode of transport by suction. This type of fixing is a preferred solution in particular for the card-like data carriers in question here as objects to be transported, because on the one hand no mechanical gripping or fixing mechanisms beyond a suction device are required to hold the data carriers to the conveying device and to transport them whilst they are hanging thereon. On the other hand, no electrical devices, such as magnetic devices or devices which act through electrostatics, are required, which could themselves interact with the data carriers in a disadvantageous manner, such as for example with their electrical components, in particular conductive tracks, antennas or semiconductor chips. In addition, this type of fixation by suction is particularly advantageous in view of the subsequent releasing and stacking of the data carriers since this can be achieved merely by reducing or terminating the suction so that the data carrier to be released detaches itself from the conveying device due to gravity. The releasing of the data carriers is therefore in particular advantageously possible using the same fixing device which also serves for the conveying beforehand, without there being a need on the one hand for separate means for fixing and transporting the data carriers and on the other hand for their release from the conveying device for the purpose of stacking, although such a separate solution is also possible.

In accordance with a further embodiment, the stacking unit is arranged to transmit a mechanical impulse to a particular data carrier which is conveyed along the conveying device in order to selectively release it. In this way, not only the selective release of the data carrier from the conveying device, but also its directional movement in the course of stacking, i. e. in particular its transfer into a card magazine provided for stacking, can be influenced or controlled in a targeted manner by the impulse transfer with regard to direction and/or speed.

In a further embodiment based thereon, the conveying device is arranged to transmit the impulse to the data carrier by blowing the data carrier away from the conveying device, i. e. by generating an air stream directed against the data carrier initially suspended from the conveying device, which air stream exerts an effect on the data carrier which repels it from the conveying device. This can in particular offer the advantage that again the same device can be used for suction and for blowing away, and the further advantage that the direction and the speed of the air flow used for the blowing away action can easily be influenced and controlled, e. g. by appropriate alignment or adjustment of the geometry, in particular the aperture size, of compressed air devices which may optionally be provided on the conveying device, such as air nozzles, for blowing away the data carriers and/or for applying suction to them.

In accordance with a further embodiment, the device for stacking card-like data carriers further comprises at least one discharge element, in particular one or more antistatic brushes. The discharge element is configured to at least partially discharge the data carriers electrically before or immediately after their release from the conveying device. In this way, electrical effects, in particular electrostatic effects, which lead to an impairment of the stacking process, for example in the form of undesirable forces acting during the transfer of the data carriers from the conveying device into the card magazine, or in the arrangement of the data carriers, in particular also in their arrangement relative to other data carriers within the card magazine, can be minimized or even completely avoided. Such a discharge element can be arranged on the conveying device and/or on the feeding device—if present—in order to discharge the data carriers conveyed thereby. In particular, by the combination of discharge elements on both the feeding device and the conveying device, both main faces of the data carriers can be discharged electrically in a particularly effective manner.

In accordance with a further embodiment, the device for stacking card-like data carriers further comprises a centering device which is arranged to align, with respect to a receiving opening of the card magazine, the data carriers selectively released from the conveying device by the stacking unit during their transfer to a card magazine located at an associated stacking position of the stacking area. On the one hand, in this way, the probability can be reduced or even reduced to substantially zero that, during the transfer of the data carriers released from the conveying device into the card magazine, errors will occur because of the fact that the trajectory of the respective data carrier and/or its orientation would not lead to a problem-free entry into the card magazine without prior correction. On the other hand, in this way, a largely consistent alignment of the data carriers transferred into the card magazine relative to each other and/or relative to the card magazine can also be facilitated or achieved.

In accordance with a further embodiment, the device for stacking card-like data carriers further comprises a card magazine feeding device for automatically feeding card magazines to a stacking position of the stacking area. The card magazine feeding device comprises a transfer area for automatically transferring a card magazine fed to it to an associated stacking position of the stacking area, wherein the transfer area comprises at least one of the following elements, preferably all of the following elements: (i) a (first) sensor arrangement which is configured to detect the presence and/or absence of a card magazine at at least one location of the card magazine feeding device; (ii) a (first) stop member for blocking a feeding of one or more further card magazines when the transfer area is still occupied by a preceding card magazine; (iii) a (first) driver member which is configured to temporarily stop a card magazine transferred into the transfer area prior to its transfer to the stacking position and to release it for onward transfer only when an automated check reveals that one or more predetermined checking criteria for checking whether the stacking position is ready to receive a card magazine are satisfied; (iv) a (first)

transfer member which is configured to transport a card magazine which is located in the transfer area further to the stacking position in the stacking area under the application of force thereto.

The (first) sensor device may comprise one or preferably several sensors, in particular one or preferably several sensors arranged at different points of the card magazine feeding device. It can detect the presence or absence of a card magazine, preferably in particular in the transfer area and/or, if applicable, at a point located at, or upstream of, the stop member and/or at the first stacking area in a sensor-based manner. In this way, the position of one or more card magazines can be detected in a sensor-based manner at the card magazine feeding device and used for optimized process control of the card magazine feeding device, in particular with regard to the automatic transfer of a card magazine from the card magazine feeding device to a stacking position in the stacking area.

The (first) stop member provides for the ability to prevent a collision of a first card magazine already positioned in the transfer area with one or more card magazines succeeding at the card magazine feeding device. This has in particular the advantage that the position and/or orientation of this first card magazine is not affected—in particular not in an unpredictable way—and thus that the transfer process is not disturbed, which could otherwise lead to errors or reduced process times, process efficiency and/or process qualities.

The (first) driver member in particular provides for the possibility of making the forwarding of a card magazine which is already located in the transfer area dependent on a check as to whether the next area of the device located downstream, i. e. the stacking area or a stacking position provided therein for receiving the card magazine, is already ready for receiving the card magazine or whether it needs to be put into a corresponding state of readiness or whether it first needs to be serviced, repaired, readjusted or the like. The checking criteria serve to define an appropriate check.

The (first) transfer member finally opens up the possibility of transporting the transfer of a card magazine which is already located in the transfer area to the stacking position in the stacking area in a controlled manner in accordance with a defined process—and not only under the influence of gravity, for example. In this way, in particular the process speed and the process reliability, i. e. also the process efficiency and process availability as well as the process quality which can be achieved can be increased or ensured.

In accordance with a further embodiment based on this, the predetermined test criterion or criteria is/are based on one or more, preferably all, of the following criteria or a combination thereof, which must be satisfied so that during the test it can be determined that the stacking position is ready for receiving a card magazine: (i) there is no card magazine at the stacking position; (ii) if a (first) stop member is provided, this is activated so that a feeding of one or more further card magazines into the transfer area is blocked; (iii) if a transfer member is provided, this is in a position from which it can transport the card magazine located in the transfer area to the stacking position; (iv) if a driver member is provided, the transport path of the card magazine from the transfer area to the stacking position is blocked only by the driver member and, if applicable, one or more further members movable in dependence thereon, so that the transport path becomes free after a subsequent movement of the driver member into a position where it is no longer blocking. As already mentioned, these criteria have in common that they can be used as indicators whether the next area of the device located downstream, i. e. the stacking area or a stacking position therein intended for receiving the card magazine, is already ready for receiving the card magazine or not.

In accordance with a further embodiment, the device for stacking card-like data carriers further comprises a lifting device which is set up and arranged: (i) to position and support, at a stacking position of the stacking area associated with the lifting device, a card magazine for receiving data carriers released by the stacking unit for transfer into the card magazine; and (ii) to move the card magazine itself or a movable stack carrier element of the card magazine along a displacement direction in dependence on the degree of filling of the card magazine, in particular in accordance with a corresponding control or feedback control, in such a way that the positioning level, at which a respective new one of the data carriers comes to lie in the card magazine during its stacking process, is kept at least substantially constant for successive data carriers. In this way it is in particular possible to keep the distance which a data carrier has to cover during its transfer from the conveying device into the card magazine at least substantially the same for several data carriers, in particular for all data carriers to be stacked one after the other in the card magazine—in particular with the exception of deviations which are smaller than the average thickness of the data carriers—and, in particular, to minimize this distance at the same time. In this way, for example, the card magazine or its movable stack carrier element can, at the beginning of the stacking process when the card magazine is still empty, be brought into a position in which the said transfer distance corresponds to the minimum transfer distance that can be set. As soon as a first one of the data carriers has been transferred into the card magazine, this or its stack carrier element can be moved in such a way that the transfer distance for the immediately following data carrier again corresponds at least approximately to the transfer distance of the preceding first data carrier. Thus, in total, in particular a corresponding step-like movement of the card magazine or its stack carrier element is advantageous.

In accordance with a further embodiment based on this, the lifting device for moving the card magazine or its movable stack carrier element comprises a drive with a telescopically extendable force transmission element, in particular a pressure cylinder. This has the advantage that the drive can have a smaller geometry, in particular a smaller maximum dimension, than the maximum travel distance of the card magazine or its movable stack carrier element. Since typical lengths of such card magazines and consequently corresponding travel distances can be in the range of several decimeters or even more, the dimensions of the device for stacking data carriers can nevertheless be kept small in this way. In particular, the stacking position on the lifting device can be provided at a low height above a base on which the device is placed, which can bring operating advantages, in particular in the monitoring, repair or maintenance of the device by operating or maintenance personnel.

In accordance with a further embodiment, the device for stacking card-like data carriers further comprises an alignment device which is arranged to act directly, or indirectly via the card magazine, on data carriers already stacked in a card magazine in such a way that these are uniformly aligned in a predetermined position or orientation within the card magazine. The alignment device may in particular comprise pressure elements, such as for example one or more pressure cylinders, which can exert a force directly on the data carriers stacked in the card magazine through one or more corresponding recesses in the card magazine in order to effect the desired alignment, in particular relative to one or more inner walls of the card magazine. The refinement of the alignment of the individual data carriers which can be achieved in this way, relative to the card magazine, as well as with one another, can be advantageous in particular with regard to any subsequent process steps in which the data carriers are to be removed again from the card magazine, since the positioning accuracy of the data carriers is increased in this way. In addition, potential stacking errors within the card magazine, e. g. by tilting of individual data carriers, can be minimized or eliminated.

In accordance with a further embodiment, the device for stacking card-like data carriers further comprises a card magazine output device which is arranged to automatically accept a card magazine filled with data carriers from the stacking area and to automatically feed it to an output position at the card magazine output device. The card magazine output device has a buffer area for temporarily receiving a card magazine taken from a stacking position of the stacking area, and the buffer area comprises at least one of the following elements, preferably all of the following elements: (i) a (second) sensor arrangement which is configured to detect the presence and/or the absence of a card magazine at at least one location located downstream of the buffer area, in particular at the output position, of the card magazine output device; (ii) a (second) stop member which is configured to block a further transport path of a card magazine located in the buffer area, which further transport path proceeds downstream towards the output position, when it is determined—by the sensor arrangement—that a portion of the card magazine output device which is located downstream of the buffer area, in particular the output position, is still occupied by a preceding card magazine, and otherwise to release the transport path; (iii) a (second) transfer member which is configured to transport a card magazine which is located at a stacking position of the stacking area into the buffer area after it has been filled with data carriers under the action of force on the latter. As used herein, the designation "second" in brackets serves solely as a way of providing a distinction from corresponding elements or components of the card magazine feeding device and is not to be understood in the sense that the card magazine output device necessarily also has a corresponding first element. The same applies the other way round to the designation "first" introduced above in connection with the card magazine feeding device.

The (second) sensor device may have one or preferably several sensors arranged, in particular, at different points of the card magazine output device. It can detect the presence or absence of a card magazine in a sensor-based manner, in particular in the buffer area and/or at a point located downstream therefrom. In this way, the position of one or more card magazines at the card magazine output device can be detected in a sensor-based manner and can be used in order to optimize the sequence control of the card magazine output device, in particular with regard to the automatic transfer of a card magazine from a stacking position in the stacking area into the buffer area, and/or from this further downstream.

The (second) stop member provides for the ability to prevent a collision of a first card magazine already positioned in the buffer area with one or more preceding card magazines which are still located downstream at the card magazine output device. This has in particular the advantage that through this the position and/or orientation of the card magazines is not affected—in particular not in an unpredictable way—by collisions and that thus the transport process for the card magazines is not disturbed, which could otherwise lead to errors or reduced process times, process efficiency and/or process qualities.

Finally, the (second) transfer member opens up the possibility of effecting the automatic transfer of a card magazine located at an associated stacking position in the stacking area to the buffer area of the card magazine output device in a controlled manner in accordance with a defined process and not only under the influence of gravity, for example. In this way, in particular the process speed and process reliability, i. e. also the process efficiency and process availability, as well as the achievable process quality can be increased or ensured.

In accordance with a further embodiment, the device for stacking card-like data carriers further comprises a counting device which is configured to count the data carriers transferred into a card magazine located at a stacking position of the stacking area and to output a corresponding filling signal, at least when, according to the count, the card magazine has reached a predetermined filling level, in particular when the card magazine is completely filled. The filling signal can be used, for example, to optimize the control of the device and in particular its efficiency and throughput time. In particular, this can advantageously be used in connection with a card magazine feeding device, so that, with the aid of the filling signal, the card magazine feeding device can be given notice in good time to prepare a further card magazine, in particular a card magazine which is still empty, for transfer to the stacking area. The same also applies in connection with a card magazine output device, whereby the latter can recognize in good time by the filling signal whether or when a card magazine that has just been filled is to be transferred into the card magazine output device, so that in good time, in particular without extending the throughput time of a card magazine through the entire device, the card magazine output device can be put into a corresponding starting position where it is ready for the receipt of a card magazine. Further, the current counter reading or the filling signal dependent thereon can also be used for checking the device and for quality assurance of the stacking process running on it, in that within the framework of monitoring, for example deviations of the counter reading or time delays of the filling signal with respect to the respective expected values are detected and signaled, for example in the form of warning signals or displays on a monitoring or control unit of the device or the like.

In accordance with a further embodiment, the device for stacking card-like data carriers further comprises an inspection device which is arranged upstream of the stacking unit. This is set up to subject, to an inspection, the card-like data carriers to be fed to the stacking unit by the conveying device. The stacking unit is configured to effect the selective release of data carriers from the conveying device in dependence on the results of the inspection previously carried out by the inspection device, so that a sorting of the data carriers in dependence on these results is achieved. The sorting can in particular be achieved in such a way that only those data carriers which successfully pass the inspection are selectively released from the conveying device at a point of the conveying device from which they can be transferred into a card magazine which is provided for this purpose and which is ready at a stacking position of the stacking area, while other data carriers which do not pass the test are either transferred into a further card magazine which is ready at a further stacking position of the stacking area, or are released from the conveying device and are deposited at a different point in the device.

In accordance with a further embodiment based on this, the device for stacking card-like data carriers further comprises an elimination area which is also located below the conveying path in relation to the direction of gravity and which is different from the stacking area. In addition, the stacking unit is set up to selectively release, in dependence on the results of the inspection previously carried out by the inspection device, certain ones of the card-like data carriers conveyed along the conveying device from the latter, in order to transfer them to the elimination area. The elimination area may in particular comprise a further conveying path, such as a conveyor belt, in order to remove the eliminated data carriers from the device. In addition, it is possible to provide several different data carrier receiving devices, such as conveyor belts or collecting containers, in the elimination area in order to sort the eliminated data carriers even further, in particular on the basis of the result of the inspection, e. g. according to a classification defined for this purpose.

In accordance with a further embodiment based thereon, the device for stacking card-like data carriers further comprises a return loop which is configured to return data carriers that have been transferred to the elimination area back to the inspection device, at least once, in order for them to undergo the inspection again. In particular, if a plurality of data carrier receiving devices are provided in the elimination area, the return loop may also be provided only for a subset of one or more of the data carrier receiving devices. In this way, for example those data carriers which have only just failed the inspection or which have failed only a predetermined subset of the test criteria used in the inspection may be transferred to a data carrier receiving device with a return loop, while others of the eliminated data carriers are transferred to a data carrier receiving device without a return loop. In this way, on the one hand, it is possible to sort, in accordance with the test results of the inspection, the data carriers initially eliminated and, on the other hand, to counteract false eliminations lying in the range of accepted fault tolerances, provided that the renewed inspection of the data carriers initially eliminated and then fed back to a new inspection with the aid of the return loop is successful. It is even conceivable to use modified, in particular refined or supplemented inspection criteria for the inspection for this second run or, if applicable, for further runs. In this way, on the one hand, for example the risk of incorrectly recognized positive test results can be countered and on the other hand, it is possible to avoid a situation where the inspection with the modified test results, which can possibly only be carried out with increased consumption of time, must in principle be applied to all data carriers, which would lead to an increase in the throughput time and thus a reduction in the process efficiency.

A second embodiment of the invention relates to a method for stacking card-like data carriers comprising the following steps: (a) transporting individual card-like data carriers by a conveying device downstream along a conveying path; (b) selectively transferring and stacking card-like data carriers conveyed along the conveying path. The card-like data carriers are conveyed at the conveying device in such a way that they are fixed to the conveying device in a hanging mode of transport. During the selective transfer and the stacking of the data carriers, certain ones of the card-like data carriers conveyed along the conveying device are released from it in order to transfer them directly into a card magazine and to stack them therein when the card magazine is arranged at a stacking position which, in relation to the direction of gravity, is situated below the conveying path.

In addition, the preferred embodiments which have been described above in relation to the device in accordance with the first embodiment of the invention, as well as their advantages, are equally applicable to the method in accordance with the second embodiment of the invention, so that corresponding embodiments of the method are equally part of the present invention.

A third embodiment of the invention relates to the use of a device in accordance with the first embodiment of the invention, in particular in accordance with one or more of its embodiments and variants described herein, for performing the method in accordance with the second embodiment of the invention.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

In the following figures, the same reference signs are used throughout for the same elements, or elements corresponding to one another, of the invention.

Figure 1:
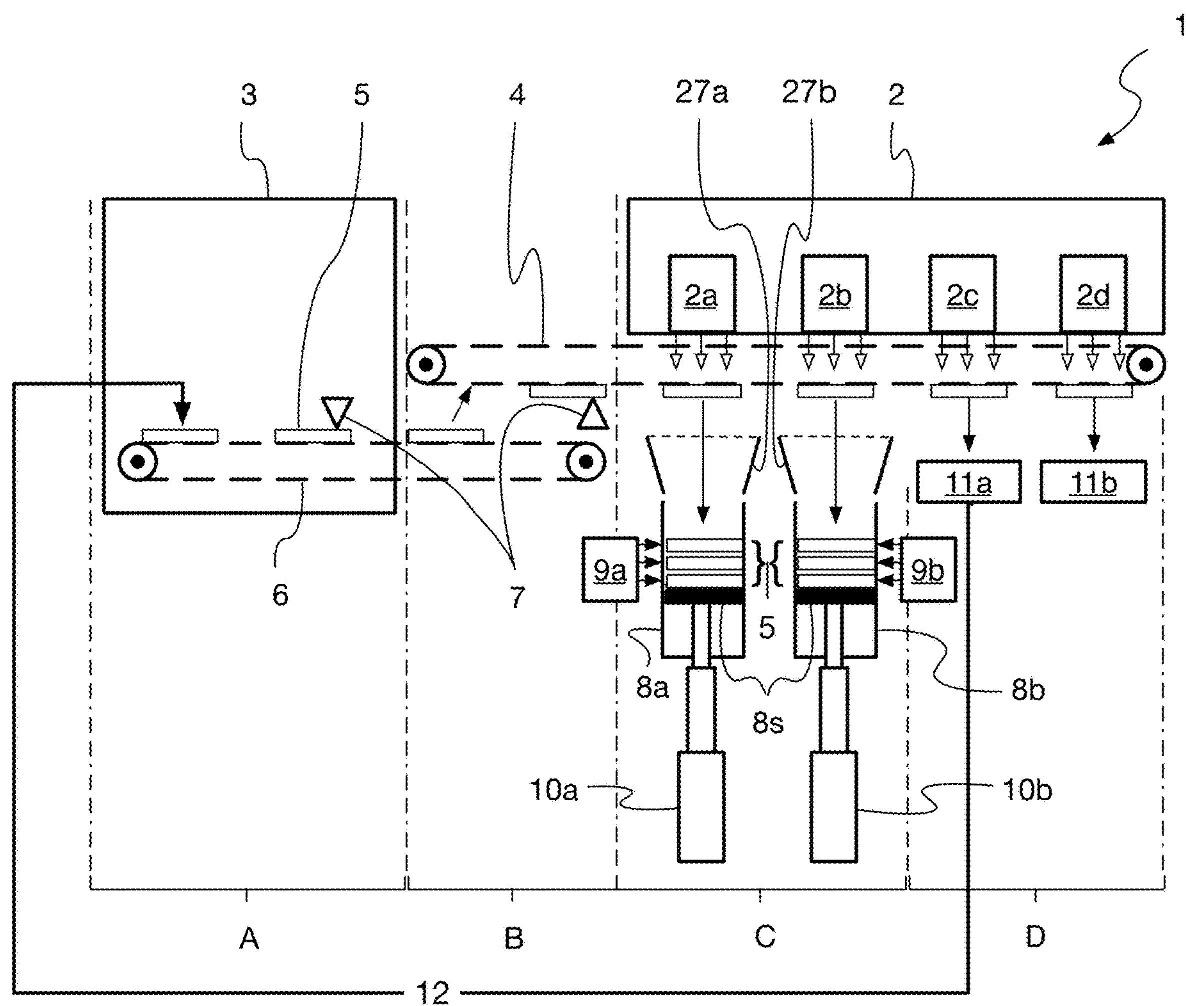
FIG. 1 is a schematic side view of a device for stacking card-like data carriers in accordance with one embodiment of the invention.

First, reference is made to FIG. 1. The device 1 shown there for stacking card-like data carriers 5, in particular chip cards, comprises a stacking unit 2, as well as an inspection device 3, which can optionally also be constructed as a personalization device for the data carriers 5. In relation to the flow of movement, through the device 1, of the individual data carriers 5 to be stacked—i. e. in particular data carriers 5 which are not packaged together or stacked or coupled to one another, the inspection device 3 is arranged in an inspection area A which is located upstream of the stacking unit 2.

In order to transport the data carriers 5, a combination of a feeding device 6, which may in particular be constructed as a conveyor belt or a vacuum belt, as well as a conveying device 4 joining onto this, is provided. The feeding device 6 serves, on the one hand, to transport the data carriers 5 within the inspection device 3 and, on the other hand, subsequently to feed the data carriers 5 to the conveying device 4. For this purpose, the device 1 has a transfer section B, in which the conveying device 4 is arranged above the feeding device 6 in such a way that data carriers 5 transported on the feeding device 6 in a lying mode of transport can be transferred to the conveying device 4 located above it, in order subsequently to be transported by this in a hanging mode of transport to the stacking unit 2. For this purpose, the conveying device 4 is constructed as a vacuum conveyor belt (vacuum belt), i. e. as a conveyor belt which is equipped to fix the data carriers on its underside by suction. The feeding device 6 can also optionally be constructed as a vacuum conveyor belt, whereby there, in contrast to the conveying device 4, the data carriers are fixed in a lying mode of transport.

If, in the transfer area B, a data carrier 5 is to be transferred from the feeding device 6 to the conveying device 4, this can be done in particular by the feeding device 6 releasing the data carrier 5 from it by applying compressed air to its main face which faces the feeding device 6 and thus effecting a pulse transfer in the direction of the conveying device 4, while at the same time the conveying device 4 applies suction to the data carrier 5 and, in the end, also fixes it for further transport by the application of suction. In an alternative embodiment of the present invention, the feeding device 6 comprises one or more additional components which are constructed in such a way that they transmit a mechanical impulse, directed towards the conveying device 4, onto the data carrier 5 when the data carrier 5 is to be released from the feeding device 6 and is to be transferred to the conveying device 4. In this alternative embodiment, a data carrier 5 can be transferred from the feeding device 6 to the conveying device 4 in particular by the additional component or components applying an impact on the main face of the data carrier 5 facing towards the feeding device 6, thereby releasing it from the feeding device 6 and imparting it with a mechanical impulse in the direction of the conveying device 4, while at the same time the conveying device 4 applies suction to the data carrier 5 and finally also fixes the latter to itself by suction, for onward transport. For example, the additional components contain one or more pins which can be moved in the direction of the main face of the data carrier 5 facing towards the feeding device 6.

The data carriers 5 which are conveyed by the feeding device 6, as well as subsequently also the data carriers 5 suspended from the conveying device 4, are each guided during their transport past a discharge element 7, such as an earthed brush made of electrically conductive material, and brought into contact therewith in order to discharge any excess electrical charge on the data carrier substrates. This serves, in particular, to reduce undesirable electrostatic effects during the subsequent transfer of the data carriers 5 into a card magazine, such as adhesion to components of device 1, or unforeseen movements due to the effects of electrical force, and ideally even to avoid them altogether.

Seen in the direction of gravity, one or more (in the present example two) stacking positions are provided within a stacking area C below the conveying device 4 and at the same time below the stacking unit 2 which is located still above it. In FIG. 1 there is a respective card magazine 8*a* or 8*b* at each of the two stacking positions shown, which is configured for receiving a stack of data carriers 5.

The data carriers 5, which have been transported by the conveying device 4 into the stacking area C in the hanging mode of transport, can be transferred selectively, in particular depending on the result of their inspection previously having taken place at the inspection device 3, by release from the conveying device 4 into one of the card magazines arranged at corresponding stacking positions in the stacking area C (shown in FIG. 1 by an arrow pointing diagonally upwards). For this purpose, compressed air units 2*a* or 2*b* are provided at the stacking unit 2, which are configured, when activated accordingly, to apply compressed air to the main face of a selected data carrier 5 which faces towards the conveying device 4 (shown in FIG. 1 by sets of hollow arrows) and thereby to transmit an impulse to it in such a way that it is released from the conveying device and is transferred into the corresponding card magazine 8*a* or 8*b* located underneath (shown in FIG. 1 by arrows pointing downward). For this purpose, in one variant, the conveyor belt of the conveying device 4 can include openings through which a compressed air blast can be directed by the correspondingly selected compressed air unit 2*a* or 2*b* onto the main face of the data carrier 5 to be detached facing the conveyor belt and to be stacked in the card magazine 8*a* or 8*b* located underneath.

In a further embodiment, one or more additional components are provided on the conveying device 4 and/or the stacking unit 2, which, when activated accordingly, transmit a mechanical impulse to the data carrier selected by the inspection device 3, which mechanical impulse is directed in the direction of the corresponding card magazine located underneath. In particular, the additional components transmit an impact on the main face of the data carrier 5 facing towards the conveying device 4, so that the data carrier 5 is released from the conveying device 4 and is transferred into the corresponding card magazine located underneath. For example, the additional components contain one or more pins which are movable in the direction of the main face of the data carrier 5 facing towards the conveying device 4. The conveyor belt of the conveying device of the further embodiment has openings through which the additional components (for example pins) transmit the mechanical impulse to the main face of the data carrier 5 facing towards the conveying device 4.

In addition, for each of the compressed air units 2*a*, 2*b*, preferably as part of the same, a counting device is provided which records the number of data carriers 5 which have been blown off by the respective compressed air units 2*a* or 2*b* respectively. In addition, a centering device 27*a* or 27*b*, in the form of a funnel or constructed as a guide plate, can be provided between the conveying device 4 and the respective card magazine in order to reliably guide the released data carrier 5 to a receiving opening of the corresponding card magazine 8*a*, 8*b*.

A drive 10*a* or 10*b* with a telescopically extendable force transmission element, in particular a telescopically extendable pressure cylinder, is provided at each of the stacking positions, which can be run, through a gap in the base of the respective card magazine 8*a*, 8*b*, into the latter in order to move a stack carrier element 8*s* which is movable in the card magazine 8*a*, 8*b* along the longitudinal axis of the card magazine 8*a*, 8*b*, or to hold it in a desired position. The respective stack carrier element 8*s* serves as a base and support for the stack of the data carriers 5 to be stacked in the card magazine. The use of a telescopically extendable force transmission element makes it possible to significantly reduce the required installation space, for example when compared with a drive with a rigid push rod of a length comparable to, or even greater than, the length of the card magazine, so that more compact and thus space-saving implementations of the device 1 are made possible.

In addition, an alignment device 9*a* or 9*b* is provided at each stacking position, which is configured to spatially align the data carriers 5 already stacked in the corresponding card magazine 8*a* or 8*b*, either indirectly via a movement (e. g. shaking) of the respective card magazine 8*a*, 8*b* or directly by engaging into a lateral gap of the respective card magazine 8*a*, 8*b* at at least one edge of the card magazine or an alignment edge additionally provided therein. This can result in a largely congruent stack, in particular for data carriers 5 with the same form factor.

In addition, as shown in FIG. 1, an elimination area D may be provided, which serves to collect data carriers 5 which have not been transferred to one of the card magazines 8*a*, 8*b* beforehand, in particular because they have been recognized, at least provisionally, as defective or potentially defective on the basis of a result of their inspection check which has taken place beforehand.

Again, one or more compressed air units 2*c* or 2*d* may be provided in the stacking unit 2 in order to selectively release the data carriers 5 which are intended for the elimination area D from the conveying device 4 at corresponding locations and to transfer them to corresponding collecting devices, which may in particular be constructed as conveyor belts 11*a* or 11*b*. In the present example, the conveyor belt 11*a* is intended to receive and to collect such data carriers 5 for which a new inspection is to be carried out by the inspection device 3, i. e. for example data carriers which are impaired in such a way that they are repairable or for which the personalization can be corrected or carried out again. These data carriers are therefore fed back to the inspection device 3 by a return loop 12—shown here only schematically—for a new passage through the device 1. The conveyor belt 11*b*, on the other hand, is intended to collect the data carriers 5 that have definitively been identified as faulty, i. e. for example data carriers that are irreparably damaged, for example because they contain defective chips or carry incorrect printing thereon.

Figure 2:
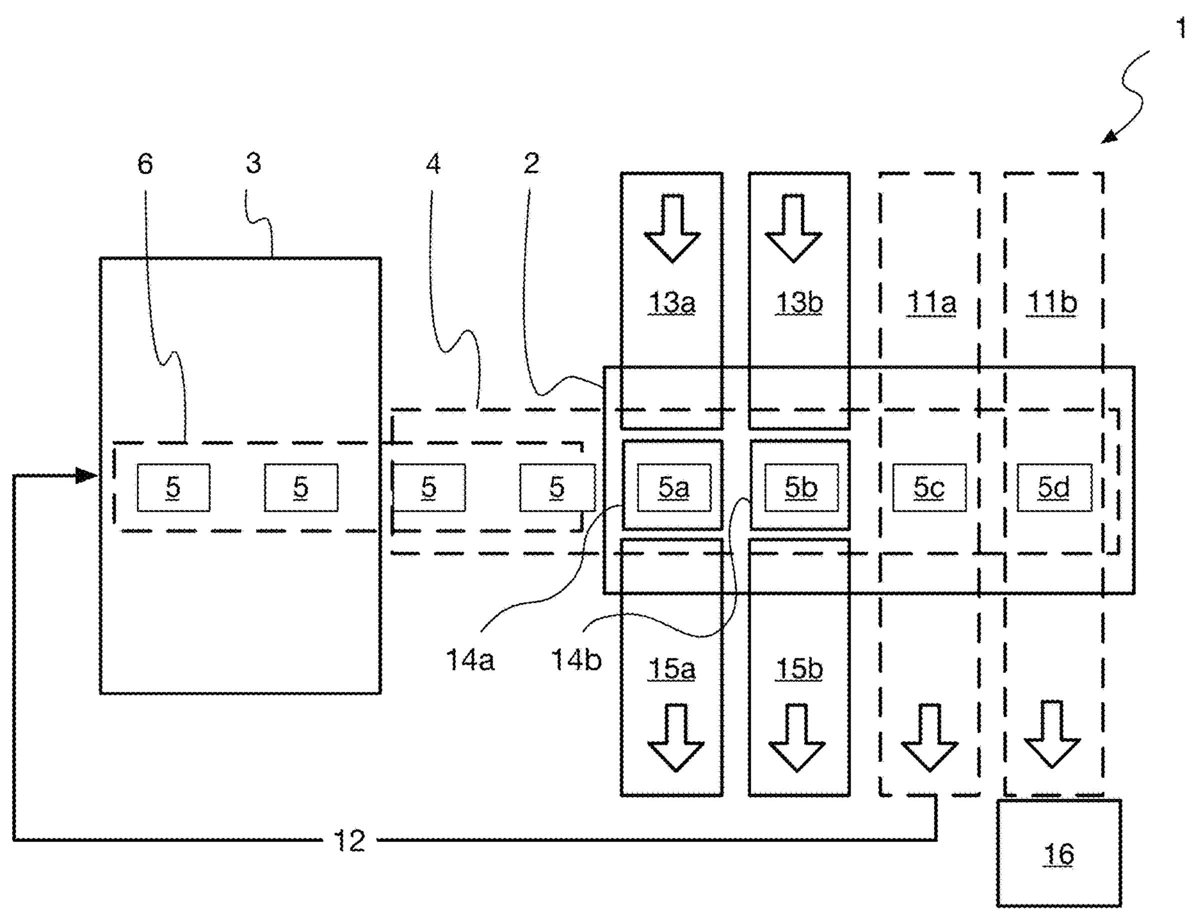
FIG. 2 is a schematic top view of the device of FIG. 1.

FIG. 2 shows the same device 1 again schematically, this time in a plan view, whereby a number of components of the device 1 which have been explained in connection with FIG. 1 are not shown here for the purpose of a better illustration. FIG. 2 illustrates in particular the handling of the card magazines. For this purpose, two card magazine feeding devices 13*a* and 13*b*, which are arranged parallel to each other, are provided, by which empty card magazines or card magazines which have spare capacity can automatically be fed to the stacking unit 2 in order to be filled with data carriers 5. Details of these card magazine feeding devices are explained below in connection with the FIGS. 3 and 4. The card magazines can automatically be transferred from the card magazine feeding devices 13*a* and 13*b* to a respective associated stacking position, which is arranged on a respective vertically movable lifting table of a lifting device 14*a* and 14*b*.

In the example shown in FIG. 2 the data carrier 5*a* is thus transferred into a first card magazine 8*a* and stacked there, which first card magazine 8*a* was automatically supplied via the card magazine feeding device 13*a*, while in the same way a further data carrier 5*b* is transferred into a further card magazine 8*b* and stacked there, which further card magazine 8*b* is located on the second lifting device 14*b*, which is automatically fed with card magazines via the card magazine feeding devices 13*b*. After the card magazines 8*a*, 8*b* are completely filled with data carriers 5 stacked therein, which can for example be detected by a counter and a comparison of the counter reading with a target number of data carriers, these are automatically transferred from the stacking position at the respective lifting device 14*a* or 14*b* into a card magazine output device 15*a* or 15*b*, which is connected downstream of the respective lifting device 14*a* or 14*b*. The further data carriers 5*c* and 5*d*, which are intended for the elimination area D, are transferred to an associated conveyor belt 11*a* or 11*b*, as has already been described above. In the present example, the data carrier 5*c* is then fed back to the inspection device 3 via the return loop 12, while the data carrier 5*d*, which has been identified as definitively defective, is fed by the conveyor belt 11*b* to a collection container 16 for defective data carriers. In this way, a sorting of the data carriers 5 on the basis of the results of their preceding inspections can be carried out by the compressed air devices 2*a* to 2*d*.

Figure 3:
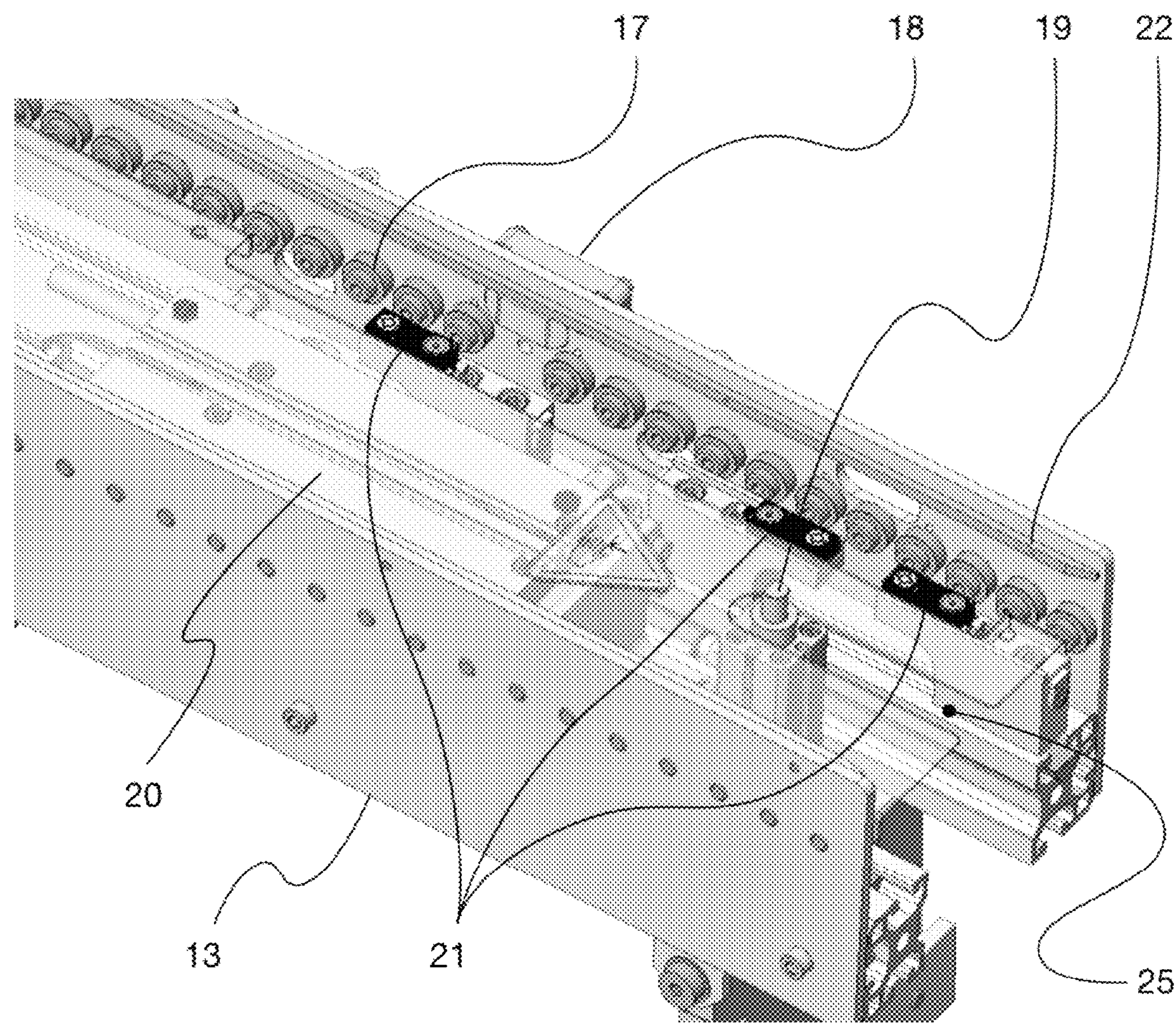
FIG. 3 is a top perspective view of a portion of a card magazine feeding device of the device of FIG. 1.

FIG. 3 shows a perspective view of a portion of a card magazine feeding device 13 (or 13*a* or 13*b*) of the device 1 in accordance with a preferred embodiment of the invention. The card magazine feeding device 13 is constructed as a running rail, on the upper side of which a running groove is provided which, as regards its cross-section, is constructed in a U-shaped manner. On both side walls of this running groove, a respective plurality of rollers 17 are provided, which are arranged in a series along the course of the running groove.

Figure 4:
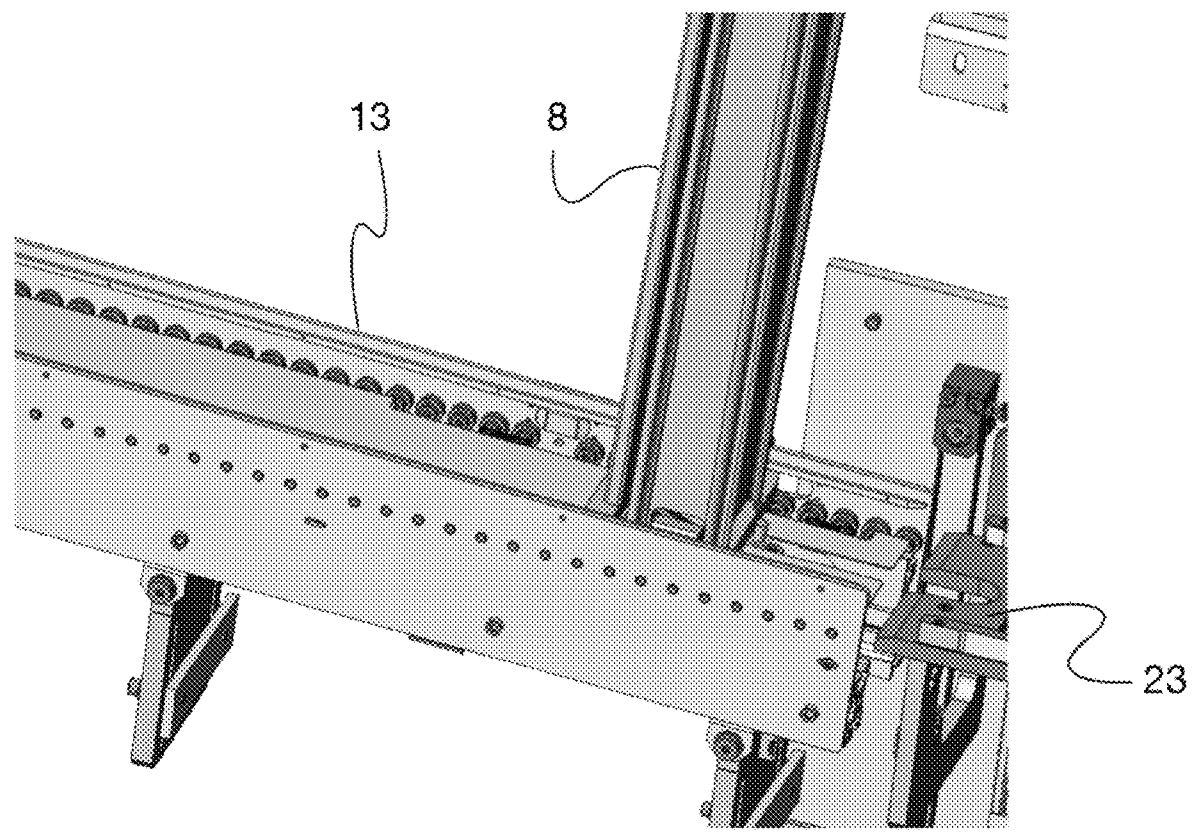
FIG. 4 is another perspective view of the card magazine feeding device of FIG. 3, together with a card magazine carried by the card magazine.

FIG. 4 shows how a card magazine 8 is positioned in an upright position on the rollers 17 for automatic transport along the card magazine feeding device 13, and how it can be transported along the running groove while being supported by the rollers 17. For this purpose, the rollers 17 may either be driven and/or the running groove may be slightly tilted with respect to the horizontal and thus form an inclined plane, so that the card magazine 8, (also) driven by gravity, is transported along the running groove to a stacking position of the stacking area, which is represented in FIG. 4 by a lifting table 23 of a corresponding lifting device 14*a, b*. Instead of the conveying by, or in combination with, the driven rollers, conveying of the card magazines on the basis of a chain or belt along the card magazine feeding device is also possible. The same applies in a corresponding manner to the card magazine output device, which is described below with reference to FIGS. 7 and 8, which card magazine output device can in particular also represent an inclined plane.

Again referring to FIG. 3, various functional elements of the card magazine feeding device 13 are now explained. A stop member 18, which can in particular be constructed as a pressure cylinder and which can be driven into the running groove of the card magazine feeding device 13, serves to define a transfer area of the card magazine feeding device 13 which transfer area is located downstream from there in relation to the direction of movement of the card magazines 8. In particular, it has the function of stopping succeeding further card magazines 8 before their respective entry into the transfer area into the running groove, and of releasing the further path by retracting out of the running groove only if one or more predetermined criteria are satisfied, in particular if the transfer area is not (or no longer) occupied by a preceding card magazine 8. In order to detect the presence of one or more card magazines 8 at the card magazine feeding device 13, a plurality of (first) sensors 21, which together form a (first) sensor arrangement, are provided at different locations of the card magazine feeding device 13. Their signals can be evaluated by a control device (not explicitly represented) and corresponding control signals for the individual functional elements of the card magazine feeding device 13 can be derived therefrom, in particular control signals for the stop member 18. The control device can for example be (i) a global control device for the entire device 1 or (ii) a control device only for the transport and the handling of the card magazines by the device 1 or (iii) a control device specifically of the card magazine feeding device 13 only.

Further, the card magazine feeding device 13 comprises a (first) driver member 19 in its transfer area, which driver member 19 can be multifunctional in particular. This is essentially a pin or the like which can be run into the running groove from an underside of the card magazine feeding device 13 and which is arranged, in the run-in state, to prevent a card magazine 8, which is located in the transfer area, from continuing its path to the subsequent stacking position in the stacking area C as long as the stacking position is not yet free or is not yet ready for the processing of a further card magazine 8. If, and in particular as soon as, this is the case, however, the driver member 19 is moved out of the running groove or retracted in order to clear the way for the card magazine 8 in the direction of the stacking position.

Furthermore, the card magazine feeding device 13 has a (first) transfer member 20, which can in particular be a pushing element which is translatorially movable along the running groove and is driven. Its function is as follows: When a card magazine 8 to be transferred to the subsequent stacking position has arrived in the transfer area, which is detected by at least one of the sensors 21, it is, as has already been described above, initially prevented from continuing its path by the extended driver member 19, which for this purpose is preferably brought into a first position at or near the downstream end of the running groove. Along the movement path of the driver member, in the transfer area, a gap 25 is provided in the running groove, through which the driver element is guided. If the driver member 19 is then moved out of the running groove accordingly in order to clear the way for the card magazine 8 to continue its path to the stacking position, the card magazine 8 continues by rolling on the rollers 17 in the direction of the stacking position. The driver member 19 is then moved along the longitudinal axis of the card magazine feeding device 13 through the gap 25 to a second position located upstream, in order for it to be positioned upstream of the card magazine 8 and then to fully extend again into the running groove. The movement along the longitudinal axis of the card magazine feeding device 13 is effected by a corresponding drive of a transfer member 20 coupled to the driver member 19. Then the driver member 19 is moved in the opposite direction by the transfer member 20, whereby this exerts a pushing force onto the driver member 19 and this in turn exerts a pushing force onto the card magazine 8 in order to push the card magazine completely to the stacking position. Finally, on both sides of the card magazine feeding device 13 there are also provided tilt protection rails 22, which serve to laterally support the card magazines 8 which are transported along the running groove during their transport, and to secure them against tipping or twisting or to guide them.

Figure 5:
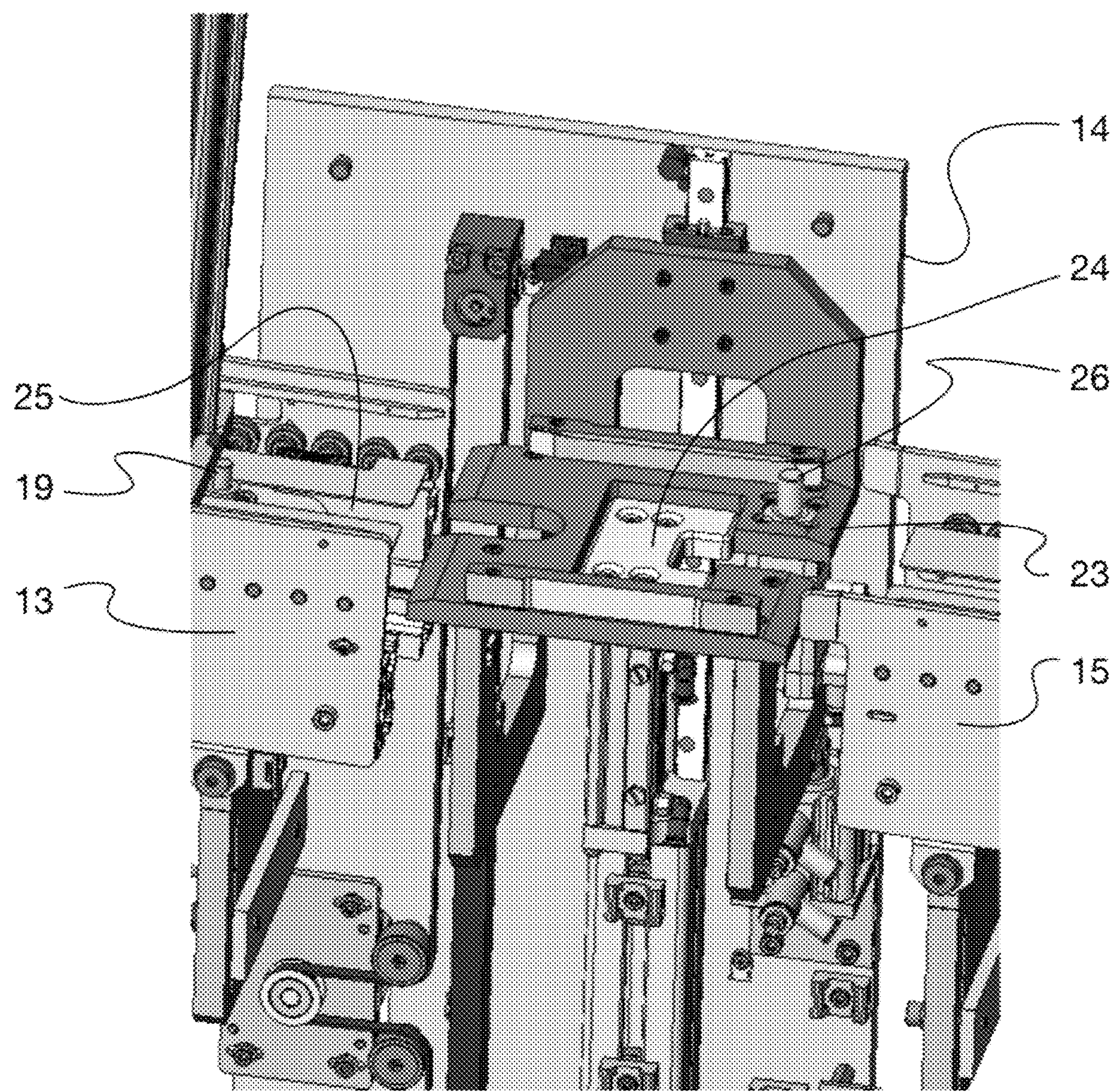
FIG. 5 is a top perspective view of a portion of a lifting device of the device of FIG. 1.

FIG. 5 shows a perspective view of a portion of a lifting device 14 (or 14*a* and 14*b*) of the device, in accordance with a preferred embodiment. The lifting device 14 is arranged between a card magazine feeding device 13 arranged upstream thereof and a card magazine output device 15 arranged downstream thereof in such a way that the lifting table 23 of the lifting device 14 is positioned between the two. A stacking position 24 is defined on the lifting table 23, which serves to receive and support an upright card magazine 8 (see FIG. 6). An extendable stop formation 26 is also provided on the lifting table 23, which extendable stop formation 26 can in particular be constructed as a stop cylinder. It serves to prevent a card magazine 8, which is located at the stacking position 24, from continuing its path in the direction of the card magazine output device 15 if, or as long as, the filling of the card magazine 8 at the stacking position 24 has not yet been completed. When the filling has been completed, however, the stop formation 26 is retracted so that the card magazine 8 can continue its path to the card magazine output device 15.

Figure 6:
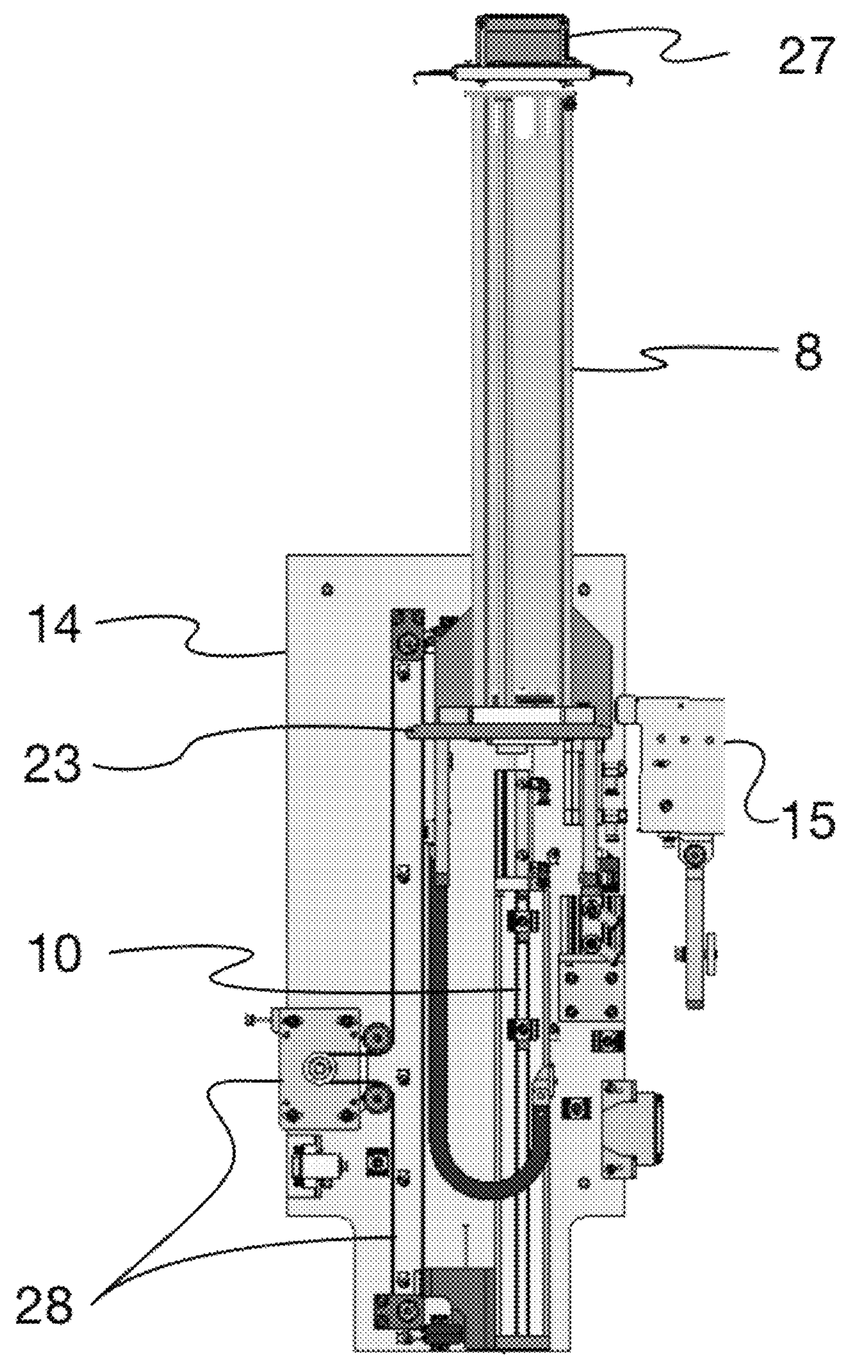
FIG. 6 is a side view of the lifting device of FIG. 5, together with a card magazine carried by the lifting device.

The further function of the lifting device 14 will now be explained with reference to FIG. 6, which shows a side view of the lifting device 14. The lifting table 23 can be moved perpendicular to its table surface by an appropriate drive 28, which is constructed as a belt drive or a chain drive, and for this purpose is supported, for example, by rails running along the direction of displacement. On the lifting table 23, as shown in FIG. 6, a card magazine 8 can be received, coming from the card magazine feeding device 13, in an upright position at the stacking position 24 of the lifting table 23. Following the receipt of a card magazine 8, the lifting table 23 is moved upwards in the direction of a centering device 27 (or 27*a*, 27*b*), which serves to, and is arranged to, fix the card magazine 8 at its upper end and, at the same time, to provide the centering function which has already been described in the context of FIG. 1 for the transfer of data carriers 5 from the conveying device 4 into the corresponding card magazine 8.

The lifting device 14 also has a drive 10 with a telescopically extendable force transmission element which is arranged underneath the lifting table 23 and which can move into the card magazine through a corresponding gap at the lower end of the card magazine. As has already been explained above with reference to FIG. 1, it serves to couple to a stack carrier element 8*s* of the card magazine 8 and to move the stack carrier element 8*s*, and thus a stack of data carriers 5 which may already be stacked on it, along the longitudinal axis of the card magazine 8 in dependence upon its degree of filling (or the number of data carriers 5 already inserted therein). This serves in particular to keep the transfer path for the data carriers 5 from the conveying device 4 to the upper end of the stack of data carriers 5 at least substantially constant for successive data carriers 5.

Figure 7:
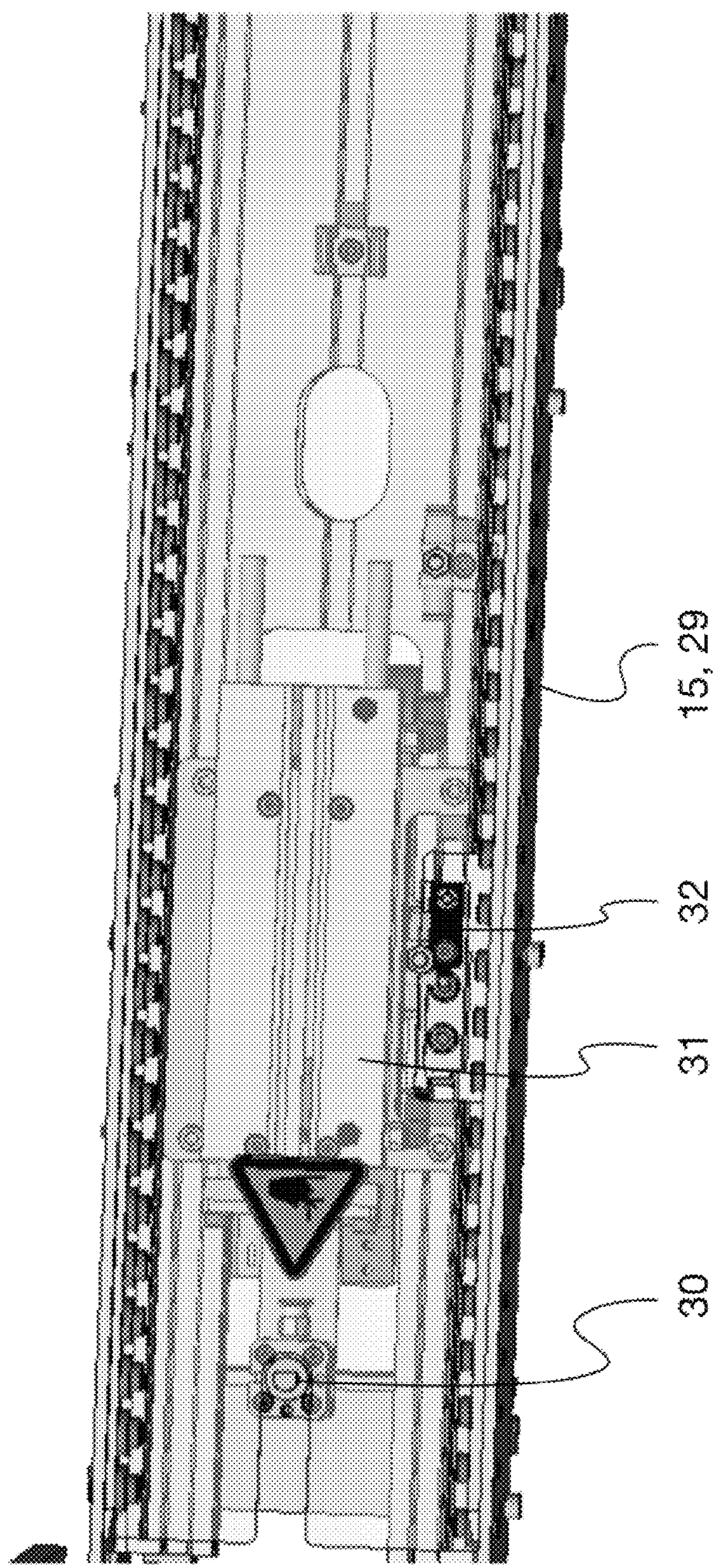
FIG. 7 is a perspective view of a portion of a card magazine output device of the device of FIG. 1, including a buffer area.
Figure 8:
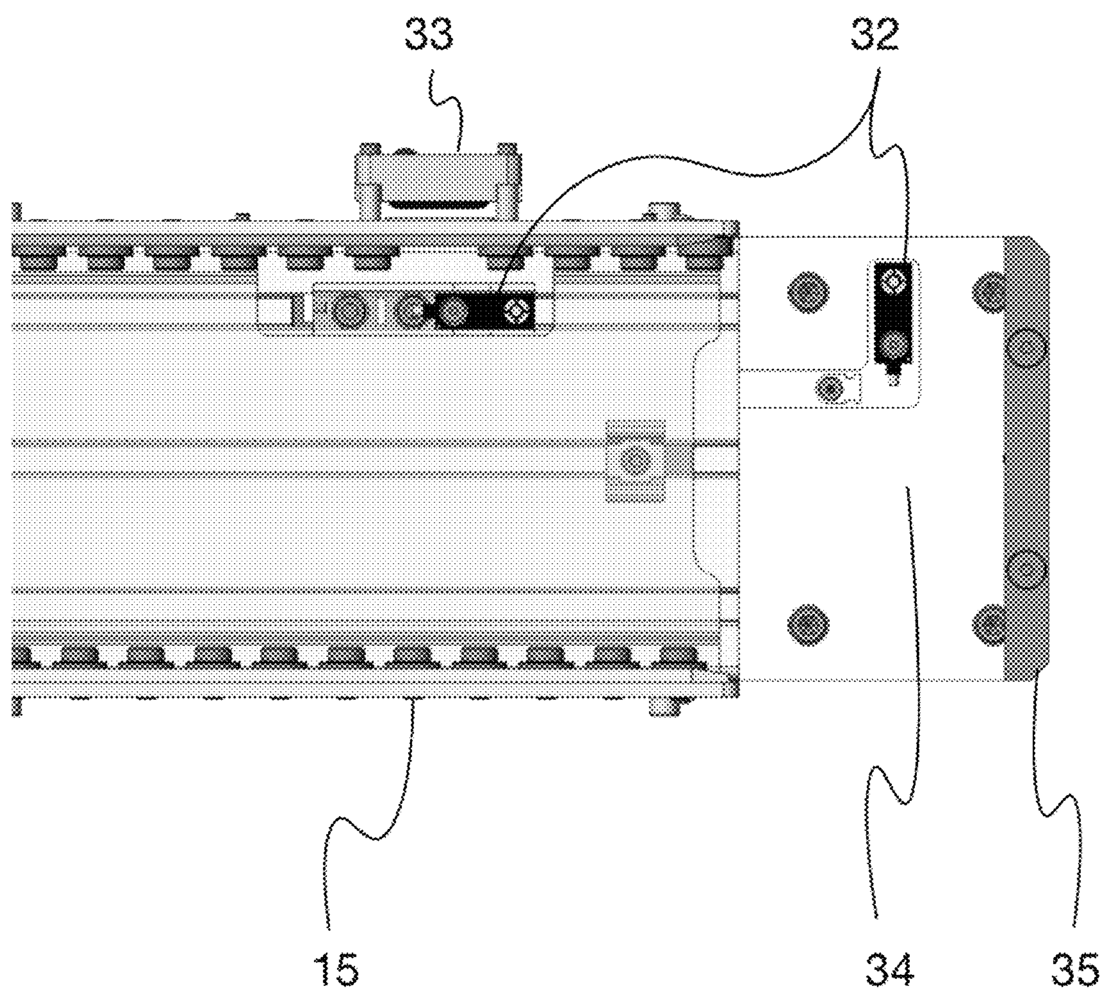
FIG. 8 is a perspective view of a further portion of a card magazine output device of the device of FIG. 1, including an output position.

FIG. 7 shows a perspective view of a portion of a card magazine output device 15 (or 15*a*, 15*b*) of the device 1, in accordance with a preferred embodiment of the invention. Its structure largely corresponds to that of the card magazine feeding device 13. The portion of the card magazine output device 15 shown in FIG. 7 in particular represents a portion of a buffer area of the card magazine output device 15, which is defined as the portion which extends between the upstream end of the card magazine feeding device 13 (adjacent to the lifting table 23) and a (second) stop member 33 which is shown in FIG. 8 and which is located further downstream. The buffer area comprises a (second) driver member 30, which is constructed similar to the (first) driver member 19 of the card magazine feeding device 13. When a card magazine 8 whose processing has been completed is to be removed automatically from the stacking position 24 of the lifting table 23, the (second) driver member 30 serves to move through corresponding gaps in the card magazine output device 15 and the lifting table 23 (see FIG. 5) under the card magazine and to engage in a recess or opening on the bottom side of the card magazine 8 and then to pull it by this into the buffer area. In addition, a (second) transfer member 31 is provided in the buffer area for this purpose, which is or can be coupled to the driver member 30 and is configured to move this and, in particular after its coupling to the card magazine 8, to pull it in the downstream direction, in order to automatically transfer the card magazine 8 into the buffer area. Further, at least one sensor 32 is provided in the buffer area, which, together with further sensors shown in FIG. 8, forms a (second) sensor unit which serves to detect the position of card magazines 8 at the card magazine output device 15.

For further explanation of the card magazine output device 15, reference is now made to FIG. 8, which shows a perspective view of the downstream portion of the card magazine output device 15. At its downstream end, the card magazine output device 15 has an output position 34 with an optional stop bar 35 at which card magazines 8 can be removed whose processing by the device 1 has been completed. At least one of the sensors 32 is arranged in such a way that it can be used to detect whether a card magazine 8 is at the output position 34. If this is the case, the (second) stop member 33 moves into the running groove of the card magazine output device 15 in order to temporarily block the advancement of further card magazines 8 into the output position 34 until this is free again.

Figure 9:
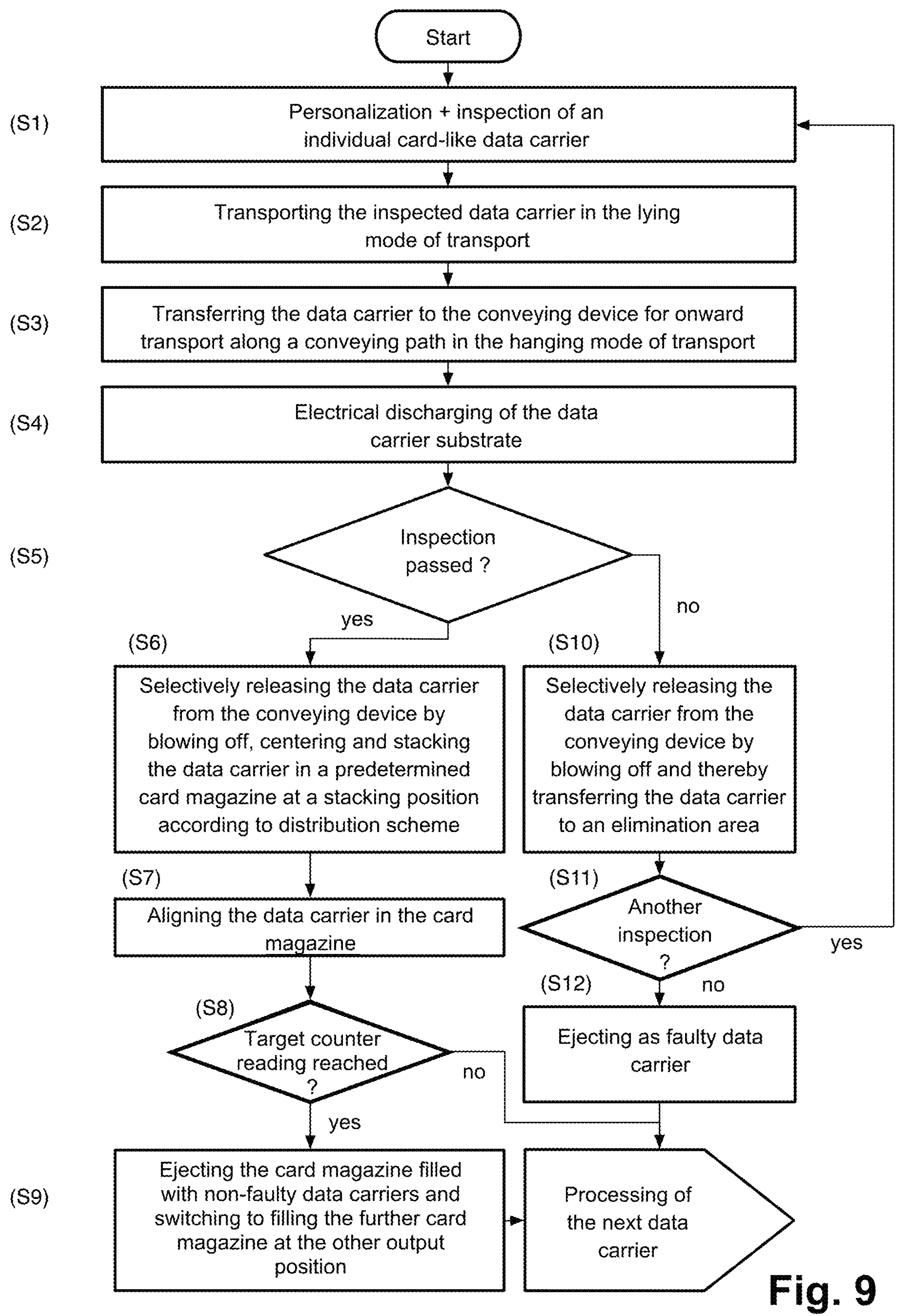
FIG. 9 is a flowchart illustrating a preferred embodiment of a method in accordance one embodiment of the invention.

FIG. 9 finally shows a flowchart in order to illustrate a preferred embodiment of the method in accordance with the invention. The method is explained below with reference to the corresponding use of a device 1—as has been described above with reference to FIGS. 1 to 8.

In the course of the method, a personalization of a data carrier 5 is carried out in a step S1, followed by an inspection of the data carrier 5. The inspection may relate in particular to the mechanical and/or electrical integrity of the data carrier and/or to a check of its personalization carried out beforehand, such as by inscription or printing of data. Then, in a further step S2, the data carrier 5 is conveyed to the transfer section B of the device 1 as an individual data carrier and in the lying mode of transport by the feeding device 6. There, in a step S3, a transfer of the data carrier 5 to the conveying device 4 takes place, for onward transport of the data carrier 5 along a conveying path, in the hanging mode of transport. During, or subsequent to, this onward transport, the data carrier 5 is brought into contact with the discharge element 7 in a step S4, in order to discharge any excess charge which may be present on the data carrier and thereby to discharge the data carrier 5.

When the data carrier 5 has reached the stacking unit 2, it is handled further in dependence on the result of the inspection which has been carried out in step S1. If it has passed the inspection (S5—yes), in a further step S6 it is selectively released from the conveying device 4 by a mechanical impulse (which is transmitted by blowing driven by compressed air or by an impact of, for example, a pin onto the main face of the data carrier facing towards the conveyor device), centered by the centering device 27 in relation to a receiving opening of a card magazine 8 located at a corresponding stacking position 24 on the lifting table 23, and transferred into the latter and stacked therein.

If, as shown in the device in accordance with FIG. 1, several card magazines 8*a*, 8*b* or stacking positions are present, a distribution scheme is used to automatically decide at which point the selective release of the data carrier 5 from the conveying device 4 is to take place and, accordingly, into which of the card magazines 8*a*, 8*b* the data carrier 5 is transferred. In an advantageous variant, the distribution scheme is defined in such a way that initially all data carriers 5 are stacked in the same card magazine 8*a* until the latter is completely filled, after which the transferring and stacking of the subsequent further data carriers 5 into the further card magazine 8*b* is carried out until in turn the latter is completely filled, after which, in turn, the stacking into a further card magazine takes place, which in the meantime has moved up to take the place of the first card magazine 8*a*.

Once the data carrier 5 is stacked in the corresponding card magazine 8*a*, 8*b*, an alignment process by the corresponding alignment device 9*a*, 9*b*, as has been described in detail above with reference to FIG. 1, follows in a further step S7, which can either be carried out individually for each of the stacked data carriers 5, or together for several data carriers 5. The data carriers 5 transferred to a card magazine 8*a*, 8*b* are counted by a counter. If, by the stacking of the data carrier 5, a target counter reading of the counter is reached which corresponds to a complete filling of the card magazine 8 (step S8—yes), then in a further step S9 the card magazine 8*a*, 8*b* filled with the data carriers 5 is automatically transferred into the card magazine output device 15*a* or 15*b* and can eventually be removed (ejected) there at the output position 34 of the latter. If this is not the case (S8—no), the next data carrier 5 is processed, which, if it has also passed the inspection (S6—yes), is then stacked in the same way in the card magazine 8*a* or 8*b* that is currently to be filled and still has spare capacity.

If, however, a data carrier 5 has not passed the inspection (S5—no), the method instead does not move from step S5 to step S6, but to step S10, in which the data carrier is selectively released from the conveying device 4 at another location thereof, in particular is blown off in the same way, and is transferred to an elimination area D of the device 1. If the inspection has carried out a classification of the data carriers which have not passed the inspection check, the data carrier is, in dependence on its corresponding allocation within the classification in step S11, either fed again to the personalization and inspection device 3 via the return loop 12 for a further run (S11—yes; for example, if only the personalization data were recognized, during the inspection, as incomplete or in other ways inadequate, but the data carrier was otherwise intact), or is finally ejected in a further step S12 as a faulty data carrier. Step S11 can in particular also be combined with step S10 in such a way that a separate conveyor belt 11*a* is provided for those data carriers 5 or 5*c* (see FIG. 1) which are to be fed back via the return loop 12, and a selective release and transfer of these data carriers 5, 5*c* to this conveyor belt 11*a* takes place, while the data carriers 5 or 5*d* which are classified as definitely defective are transferred in the same way to a further conveyor belt 11*b* without connection to the or a return loop 12.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCE SIGNS

A inspection area
B transfer section
C stacking area
D elimination area
1 device for stacking card-like data carriers
2 stacking unit

2*a-d* compressed air units
3 inspection device, optionally at the same time personalization device
4 conveying device
5, 5*a-d* card-like data carrier, in particular chip card
6 feeding device for individual data carriers
7 discharge element(s), in particular discharge brush(es)
8, 8*a, b* card magazine
8*s* stack carrier element
9*a,b* alignment device
10*a,b* drive with telescopically extendable force transmission element
11*a* conveyor belt for the transport of data carriers which have temporarily been assessed as being faulty
11*b* conveyor belt for the transport of data carriers which have definitely been assessed as being faulty
12 return loop
13, 13*a,b* card magazine feeding device
14*a,b* lifting devices
15, 15*a,b* card magazine output device
16 collection container for faulty data carriers
17 roller
18 (first) stop member
19 (first) driver member
20 (first) transfer member
21 (first) sensors, together: (first) sensor arrangement
22 tilt protection rail
23 movable lifting table (with stacking position) of the lifting device
24 stacking position
25 gap in the transfer area of the card magazine feeding device
26 stop formation, in particular stop cylinder
27, 27*a,b* centering device with card magazine holder
28 belt or chain drive for lifting table
29 buffer area of the card magazine output device
30 (second) driver member
31 (second) transfer member
32 (second) sensors, together: (second) sensor arrangement
33 (second) stop member
34 output position of the card magazine output device
35 stop bar

What is claimed is:

1. A device for stacking card-like data carriers, comprising:

a conveying device for transporting individual card-like data carriers downstream along a conveying path; and a stacking unit for selectively transferring and stacking card-like data carriers conveyed along the conveying path;

wherein the conveying device is arranged to convey the card-like data carriers in such a way that the card-like data carriers are fixed to the conveying device in a hanging mode of transport;

the stacking unit is arranged to selectively release certain ones of the card-like data carriers conveyed along the conveying device from the conveying device in order to transfer them directly into a card magazine and to stack them therein when the card magazine is arranged in a stacking area at a stacking position which, in relation to a direction of gravity, is situated below the conveying path, the stacking unit is further arranged to transmit a mechanical impulse to a particular data carrier which is conveyed along the conveying device in order to selectively release it, wherein the mechanical impulse is directed in a direction of the card magazine into which this particular data carrier is to be transferred, and the stacking unit is arranged to transmit the mechanical impulse to the data carrier by blowing away from the conveying device, and specifically by generating an air current that is directed towards the data carrier initially hanging on the conveying device so as to exert an effect on the data carrier which repels the data carrier from the conveying device.

2. The device of claim 1, wherein at least one of the conveying device and the stacking unit has one or more additional components which are constructed in such a way that the additional components transmit the mechanical impulse by an impact onto a main face of the data carrier (5) facing towards the conveying device.

3. The device of claim 1, wherein the stacking area comprises a first stacking position and at least one further stacking position, each of which is located—in relation to the direction of gravity—below the conveying path, wherein the first stacking position is configured to receive the card magazine and each of the at least one further stacking position is configured to receive another card magazine; and wherein the stacking unit is arranged to selectively release certain card-like data carriers conveyed along the conveying device from the conveying device in order to transfer the card-like data carriers directly to, and stack the card-like data carriers in, the card magazine located at the first or at one of the further stacking positions.

4. The device of claim 3, wherein the stacking unit is arranged to selectively release certain ones of the card-like data carriers conveyed along the conveying device from the conveying device in order to transfer the card-like data carriers in an alternating manner, in accordance with a predetermined distribution scheme, either into the card magazine arranged at the first stacking position or into the at least one further card magazine respectively arranged at one of the further stacking positions and to stack the card-like data carriers therein.

5. The device of claim 4, wherein the distribution scheme provides—at least in sections—that initially a first one of the card magazines is filled to a defined filling level before a further one of the card magazines is alternately filled.

6. The device of claim 1, further comprising:

a feeding device for feeding the data carriers to the conveying device; and a transfer section which is arranged to remove the data carriers transported by the feeding device from the feeding device and to transfer the data carriers to the conveying device in such a way that the data carriers are transferred from the feeding device to the hanging mode of transport on the conveying device in an area of the conveying path which is located upstream of the stacking unit.

7. The device of claim 1, wherein the conveying device is arranged to convey the data carriers in such a way that the data carriers are fixed to the conveying device in the hanging mode of transport by suction.

8. The device of claim 1, further comprising:

at least one discharge element which is configured to at least partially discharge the data carriers electrically before release from the conveying device.

9. The device of claim 1, further comprising:

a centering device which is arranged to align, with respect to a receiving opening of the card magazine, the data carriers selectively released from the conveying device by the stacking unit during transfer to a card magazine located at an associated stacking position of the stacking area.

10. The device of claim 1, further comprising:

a card magazine feeding device for automatically feeding card magazines to a stacking position of the stacking area, wherein the card magazine feeding device comprises a transfer area for automatically transferring a card magazine fed to the feeding device to an associated stacking position of the stacking area, wherein the transfer area comprises at least one of the following elements:

a first sensor arrangement which is configured to detect presence and absence of a card magazine at at least one location of the card magazine feeding device;

a first stop member for blocking a feeding of one or more further card magazines when the transfer area is still occupied by a preceding card magazine;

a first driver member which is configured to temporarily stop a card magazine transferred into the transfer area prior to transfer to the stacking position and to release the card magazine for onward transfer only when an automated check reveals that one or more predetermined checking criteria for checking whether the stacking position is ready to receive a card magazine are satisfied; and a first transfer member which is configured to automatically transport a card magazine which is located in the transfer area further to the stacking position in the stacking area under an application of force thereto.

11. The device of claim 10, wherein the predetermined checking criteria are based on one or more of the following criteria, which must be satisfied so that it can be determined that the stacking position is ready to receive a card magazine:

there is no card magazine at the stacking position;

if a stop member is provided, the stop member is activated so that a feeding of one or more further card magazines into the transfer area is blocked;

if a transfer member is provided, the transfer member is in a position from which the transfer member can transport the card magazine located in the transfer area to the stacking position; and if a driver member is provided, a transport path of the card magazine from the transfer area to the stacking position is blocked only by the driver member and, if applicable, one or more further members movable in dependence thereon, so that the transport path becomes free after a subsequent movement of the driver member into a position where the driver member is no longer blocking.

12. The device of claim 1, further comprising:

a lifting device which is set up and arranged to position and support, at a stacking position of the stacking area associated with the lifting device, a card magazine for receiving data carriers released by the stacking unit for transfer into the card magazine; and to move the card magazine itself or a movable stack carrier element of the card magazine along a displacement direction in dependence on a degree of filling of the card magazine, in such a way that a positioning level, at which a respective new one of the data carriers comes to lie in the card magazine during its stacking process, is kept at least substantially constant for successive data carriers.

13. The device of claim 12, wherein the lifting device for moving the card magazine or the movable stack carrier element comprises a drive with a telescopically extendable force transmission element.

14. The device of claim 1, further comprising:

an alignment device which is arranged to act directly, or indirectly via the card magazine, on data carriers already stacked in a card magazine in such a way that the data carriers are uniformly aligned in a predetermined position within the card magazine.

15. The device of claim 1, further comprising:

a card magazine output device which is arranged to automatically accept a card magazine filled with data carriers from the stacking area and to automatically feed the card magazine to an output position at the card magazine output device;

wherein the card magazine output device has a buffer area for temporarily receiving a card magazine taken from a stacking position of the stacking area, and the buffer area comprises at least one of the following elements:

a second sensor arrangement which is configured to detect presence and absence of a card magazine at at least one location located downstream of the buffer area, and specifically at the output position of the card magazine output device;

a second stop member which is configured to block a further transport path of a card magazine located in the buffer area, which further transport path proceeds downstream towards the output position, when it is determined that a portion of the card magazine output device which is located downstream of the buffer area is still occupied by a preceding card magazine, and otherwise to release the transport path; and a second transfer member which is configured to automatically transport a card magazine which is located at a stacking position of the stacking area into the buffer area after it has been filled with data carriers under action of force on the data carriers.

16. The device of claim 1, further comprising:

a counting device which is configured to count the data carriers transferred into a card magazine located at a stacking position of the stacking area and to output a corresponding filling signal, at least when, according to the count, the card magazine has reached a predetermined filling level.

17. The device of claim 1, further comprising:

an inspection device which is arranged upstream of the stacking unit;

wherein the inspection device is set up to subject the card-like data carriers to be fed to the stacking unit by the conveying device to an inspection; and wherein the stacking unit is configured to effect the selective release of data carriers from the conveying device in dependence on results of the inspection previously carried out by the inspection device, so that a sorting of the data carriers in dependence on these results is achieved.

18. The device of claim 17, further comprising:

an elimination area which is also located below the conveying path in relation to the direction of gravity and which is different from the stacking area;

wherein the stacking unit is further set up to selectively release, in dependence on results of the inspection previously carried out by the inspection device, certain ones of the card-like data carriers conveyed along the conveying device from the latter, in order to transfer such certain ones of the card-like data carriers to the elimination area.

19. The device of claim 18, further comprising:

a return loop which is configured to return data carriers that have been transferred to the elimination area back to the inspection device, at least once, in order for the data carriers to undergo the inspection again.

20. The device of claim 1, wherein the stacking area comprises a first stacking position and at least one further stacking position, each of which is located—in relation to the direction of gravity—below the conveying path, wherein the first stacking position is configured to receive the card magazine and each of the at least one further stacking position is configured to receive another card magazine;

wherein the stacking unit is arranged to selectively release certain card-like data carriers conveyed along the conveying device from the conveying device in order to transfer the card-like data carriers directly to, and stack the card-like data carriers in, the card magazine located at the first or at one of the further stacking positions, wherein the stacking unit is arranged to selectively release certain ones of the card-like data carriers conveyed along the conveying device from the conveying device in order to transfer the card-like data carriers in an alternating manner, in accordance with a predetermined distribution scheme, either into the card magazine arranged at the first stacking position or into the at least one further card magazine respectively arranged at one of the further stacking positions and to stack the card-like data carriers therein, wherein the distribution scheme provides—at least in sections—that initially a first one of the card magazines is filled to a defined filling level before a further one of the card magazines is alternately filled, wherein the device further comprises:

a feeding device for feeding the data carriers to the conveying device; and a transfer section which is arranged to remove the data carriers transported by the feeding device from the feeding device and to transfer the data carriers to the conveying device in such a way that the data carriers are transferred from the feeding device to the hanging mode of transport on the conveying device in an area of the conveying path which is located upstream of the stacking unit, wherein the conveying device is arranged to convey the data carriers in such a way that the data carriers are fixed to the conveying device in the hanging mode of transport by suction, wherein the device further comprises:

at least one discharge element which is configured to at least partially discharge the data carriers electrically before release from the conveying device;

a centering device which is arranged to align, with respect to a receiving opening of the card magazine, the data carriers selectively released from the conveying device by the stacking unit during transfer to a card magazine located at an associated stacking position of the stacking area;

a card magazine feeding device for automatically feeding card magazines to a stacking position of the stacking area, wherein the card magazine feeding device comprises a transfer area for automatically transferring a card magazine fed to the feeding device to an associated stacking position of the stacking area, wherein the transfer area comprises at least one of the following elements:

a first sensor arrangement which is configured to detect presence and absence of a card magazine at at least one location of the card magazine feeding device;

a first stop member for blocking a feeding of one or more further card magazines when the transfer area is still occupied by a preceding card magazine;

a first driver member which is configured to temporarily stop a card magazine transferred into the transfer area prior to transfer to the stacking position and to release the card magazine for onward transfer only when an automated check reveals that one or more predetermined checking criteria for checking whether the stacking position is ready to receive a card magazine are satisfied; and a first transfer member which is configured to automatically transport a card magazine which is located in the transfer area further to the stacking position in the stacking area under an application of force thereto, wherein the predetermined checking criteria are based on one or more of the following criteria, which must be satisfied so that it can be determined that the stacking position is ready to receive a card magazine:

there is no card magazine at the stacking position;

if a stop member is provided, the stop member is activated so that a feeding of one or more further card magazines into the transfer area is blocked;

if a transfer member is provided, the transfer member is in a position from which the transfer member can transport the card magazine located in the transfer area to the stacking position; and if a driver member is provided, a transport path of the card magazine from the transfer area to the stacking position is blocked only by the driver member and, if applicable, one or more further members movable in dependence thereon, so that the transport path becomes free after a subsequent movement of the driver member into a position where the driver member is no longer blocking, wherein the device further comprises:

a lifting device which is set up and arranged to position and support, at a stacking position of the stacking area associated with the lifting device, a card magazine for receiving data carriers released by the stacking unit for transfer into the card magazine; and to move the card magazine itself or a movable stack carrier element of the card magazine along a displacement direction in dependence on a degree of filling of the card magazine, in such a way that a positioning level, at which a respective new one of the data carriers comes to lie in the card magazine during its stacking process, is kept at least substantially constant for successive data carriers, wherein the lifting device for moving the card magazine or the movable stack carrier element comprises a drive with a telescopically extendable force transmission element, wherein the device further comprises:

an alignment device which is arranged to act directly, or indirectly via the card magazine, on data carriers already stacked in a card magazine in such a way that the data carriers are uniformly aligned in a predetermined position within the card magazine;

a card magazine output device which is arranged to automatically accept a card magazine filled with data carriers from the stacking area and to automatically feed the card magazine to an output position at the card magazine output device;

wherein the card magazine output device has a buffer area for temporarily receiving a card magazine taken from a stacking position of the stacking area, and the buffer area comprises at least one of the following elements:

a second sensor arrangement which is configured to detect presence and absence of a card magazine at at least one location located downstream of the buffer area, and specifically at the output position of the card magazine output device;

a second stop member which is configured to block a further transport path of a card magazine located in the buffer area, which further transport path proceeds downstream towards the output position, when it is determined that a portion of the card magazine output device which is located downstream of the buffer area is still occupied by a preceding card magazine, and otherwise to release the transport path; and a second transfer member which is configured to automatically transport a card magazine which is located at a stacking position of the stacking area into the buffer area after it has been filled with data carriers under action of force on the data carriers, a counting device which is configured to count the data carriers transferred into a card magazine located at a stacking position of the stacking area and to output a corresponding filling signal, at least when, according to the count, the card magazine has reached a predetermined filling level;

an inspection device which is arranged upstream of the stacking unit;

wherein the inspection device is set up to subject the card-like data carriers to be fed to the stacking unit by the conveying device to an inspection; and wherein the stacking unit is configured to effect the selective release of data carriers from the conveying device in dependence on results of the inspection previously carried out by the inspection device, so that a sorting of the data carriers in dependence on these results is achieved, the device further comprising:

an elimination area which is also located below the conveying path in relation to the direction of gravity and which is different from the stacking area;

wherein the stacking unit is further set up to selectively release, in dependence on results of the inspection previously carried out by the inspection device, certain ones of the card-like data carriers conveyed along the conveying device from the latter, in order to transfer such certain ones of the card-like data carriers to the elimination area; and a return loop which is configured to return data carriers that have been transferred to the elimination area back to the inspection device, at least once, in order for the data carriers to undergo the inspection again.

21. A method of stacking card-like data carriers, comprising:

transporting individual card-like data carriers by a conveying device downstream along a conveying path; and selectively transferring and stacking card-like data carriers conveyed along the conveying path;

wherein the card-like data carriers are conveyed at the conveying device in such a way that the card-like data carriers are fixed to the conveying device in a hanging mode of transport;

wherein, during the selective transfer and the stacking of the data carriers, certain ones of the card-like data carriers conveyed along the conveying device are released from the conveying device in order to transfer the data carriers directly into a card magazine and to stack the data carriers therein when the card magazine is arranged at a stacking position which, in relation to a direction of gravity, is situated below the conveying path, wherein a mechanical impulse is transmitted to a particular data carrier which is conveyed along the conveying device in order to selectively release the particular data carrier, wherein the mechanical impulse is directed in a direction of the card magazine into which the particular data carrier is to be transferred, and wherein the mechanical impulse is transmitted by blowing the data carrier away from the conveying device.

22. The method of claim 21, wherein the mechanical impulse is transmitted by generating an air current that is directed towards the data carrier initially hanging on the conveying device and which exerts an effect on the data carrier which repels the data carrier from the conveying device.

23. The method of claim 21, wherein the mechanical impulse is transmitted by an impact from one or more additional components onto a main side of the data carrier facing towards the conveying device (4).

* * * * *